United States Patent
Miyazaki et al.

(10) Patent No.: US 11,621,618 B2
(45) Date of Patent: Apr. 4, 2023

(54) COIL SEGMENT PROCESSING METHOD, COIL SEGMENT PROCESSING APPARATUS AND CONNECTION STRUCTURE OF COIL SEGMENTS

(71) Applicant: ODAWARA ENGINEERING CO., LTD., Kanagawa (JP)

(72) Inventors: Yuji Miyazaki, Kanagawa (JP); Noburo Miyawaki, Kanagawa (JP)

(73) Assignee: ODAWARA ENGINEERING CO., LTD., Kanagawa (JP)

( * ) Notice: Subject to any disclaimer, the term of this patent is extended or adjusted under 35 U.S.C. 154(b) by 261 days.

(21) Appl. No.: 16/872,744

(22) Filed: May 12, 2020

(65) Prior Publication Data
US 2020/0274425 A1    Aug. 27, 2020

Related U.S. Application Data

(63) Continuation of application No. PCT/JP2018/041873, filed on Nov. 12, 2018.

(30) Foreign Application Priority Data

Nov. 13, 2017  (JP) ............................. JP2017-218645

(51) Int. Cl.
*H02K 15/08*    (2006.01)
*H02K 3/12*    (2006.01)

(52) U.S. Cl.
CPC ............... *H02K 15/08* (2013.01); *H02K 3/12* (2013.01)

(58) Field of Classification Search
CPC .. H02K 3/04; H02K 3/34; H02K 3/50; H02K 15/04; H02K 15/08
See application file for complete search history.

(56) References Cited

U.S. PATENT DOCUMENTS

| | | | |
|---|---|---|---|
| 10,263,484 B2 | 4/2019 | Mizutani | |
| 2003/0122441 A1 | 7/2003 | Masegi | |

(Continued)

FOREIGN PATENT DOCUMENTS

| | | |
|---|---|---|
| CN | 101515733 A | 8/2009 |
| CN | 103947082 A | 7/2014 |

(Continued)

OTHER PUBLICATIONS

Office Action issued in Chinese Appln. No. 201880073466.0 dated Nov. 25, 2021. English translation provided.

(Continued)

*Primary Examiner* — Ahmed Elnakib
*Assistant Examiner* — Minki Chang
(74) *Attorney, Agent, or Firm* — Rossi, Kimms & McDowell LLP

(57) ABSTRACT

The innermost first segment layer and the second segment layer adjacent thereto in a radial direction are twisted using a twisting jig unit including an inner twisting jig and an outer twisting jig, then the twisting jig unit is replaced with another twisting jig unit including an inner twisting jig and an outer twisting jig, and the third segment layer and the fourth segment layer adjacent thereto are twisted, and then the twisting jig unit is replaced with still another twisting jig unit including an inner twisting jig and an outer twisting jig, and the fifth segment layer and the sixth segment layer adjacent thereto are twisted.

17 Claims, 21 Drawing Sheets

(56) References Cited

U.S. PATENT DOCUMENTS

| | | |
|---|---|---|
| 2009/0200888 A1 | 8/2009 | Tanaka |
| 2014/0035404 A1 | 2/2014 | Hamer |
| 2014/0225465 A1 | 8/2014 | Goto |
| 2014/0292119 A1 | 10/2014 | Takahashi |
| 2015/0180319 A1 | 6/2015 | Kimura |
| 2018/0309337 A1* | 10/2018 | Lee .......................... H02K 3/32 |
| 2018/0375409 A1 | 12/2018 | Yoshida |

FOREIGN PATENT DOCUMENTS

| | | | |
|---|---|---|---|
| EP | 1381140 A2 | | 1/2004 |
| JP | 2003259613 A | | 9/2003 |
| JP | 2004135438 A | | 4/2004 |
| JP | 2007311041 A | | 11/2007 |
| JP | 2009219343 A | | 9/2009 |
| JP | 2013039001 A | * | 2/2013 |
| JP | 2013039001 A | | 2/2013 |
| JP | 2015027258 A | | 2/2015 |
| JP | 6196720 B1 | | 9/2017 |
| WO | 2015097528 A2 | | 7/2015 |
| WO | 2017104685 A1 | | 6/2017 |

OTHER PUBLICATIONS

Submission of Information submitted in Japanese Appln. No. 2019-552422 on Oct. 19, 2021. English translation provided.

Office Action issued in Japanese Appln. No. 2019-552422 dated Nov. 24, 2021. English machine translation provided.

Deng. "Type JD160A VVVf asynchronous traction motor." Electric Locomotives & Mass Transit Vehicles. May 20, 2012: 27-30. Vol. 35, No. 3. English abstract provided.

International Search Report issued in Intl. Appln. No PCT/JP2018/041873 dated Dec. 25, 2018. English translation provided.

Written Opinion issued in Intl. Appln. No. PCT/JP2018/041873 dated Dec. 25, 2018.

Extended European Search Report issued in European Appln. No. 18877025.9 dated Jan. 12, 2021.

English translation of Written Opinion issued in Intl. Appln. No. PCT/JP2018/041873 dated Dec. 25, 2018, previously cited in IDS filed May 12, 2020.

International Preliminary Report on Patentability issued in Intl. Appln. No. PCT/JP2018/041873 dated May 28, 2020. English translation provided.

* cited by examiner

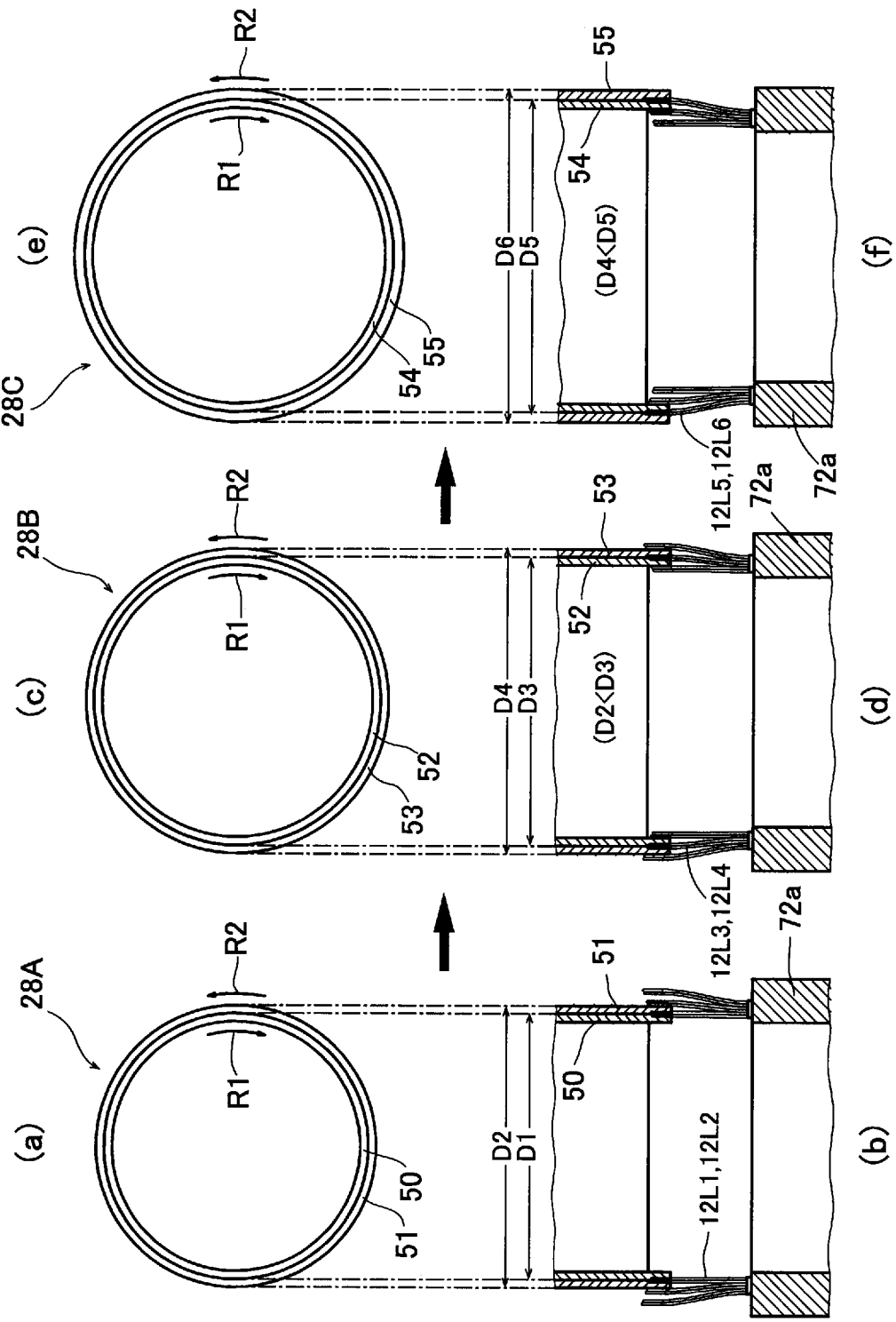

[Fig.2]
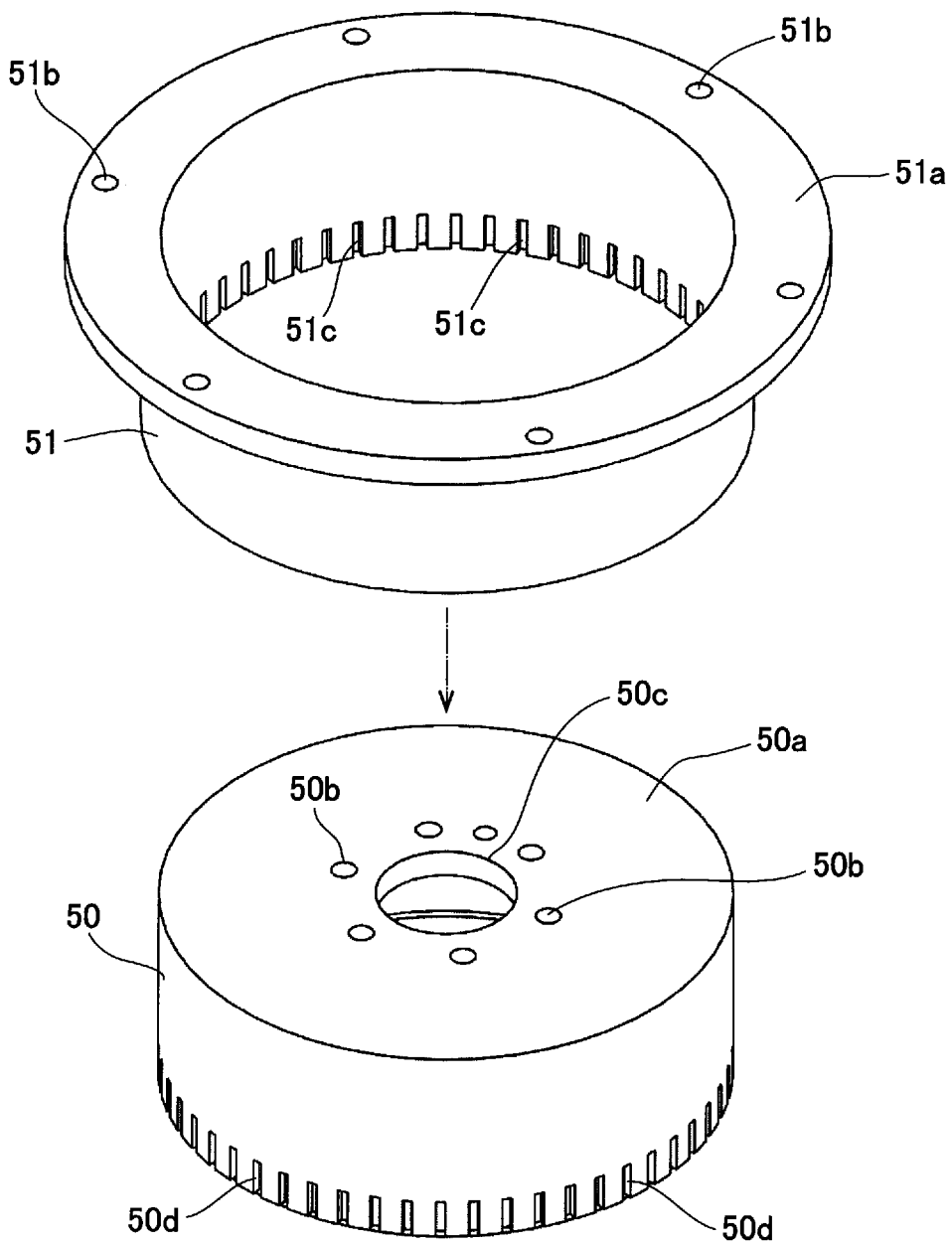

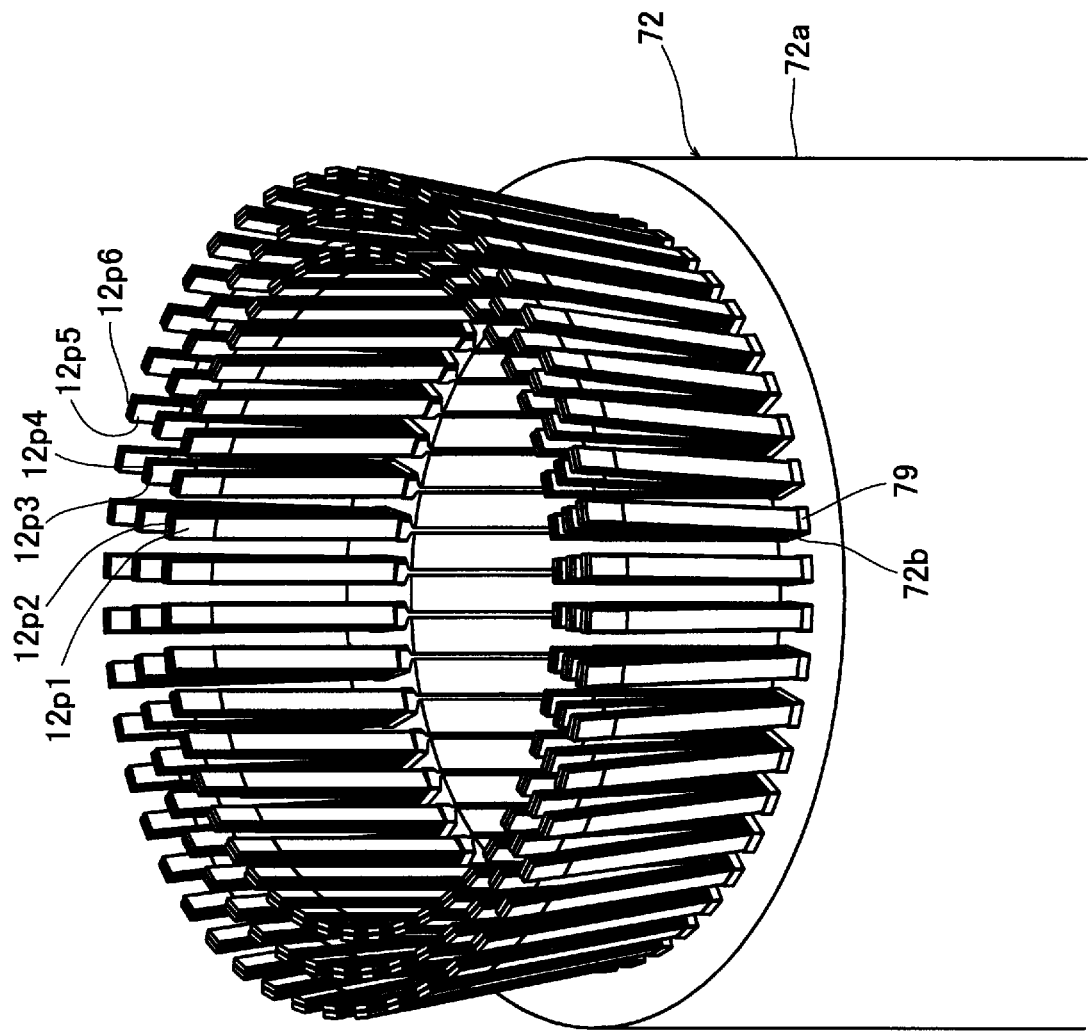
[Fig.3]

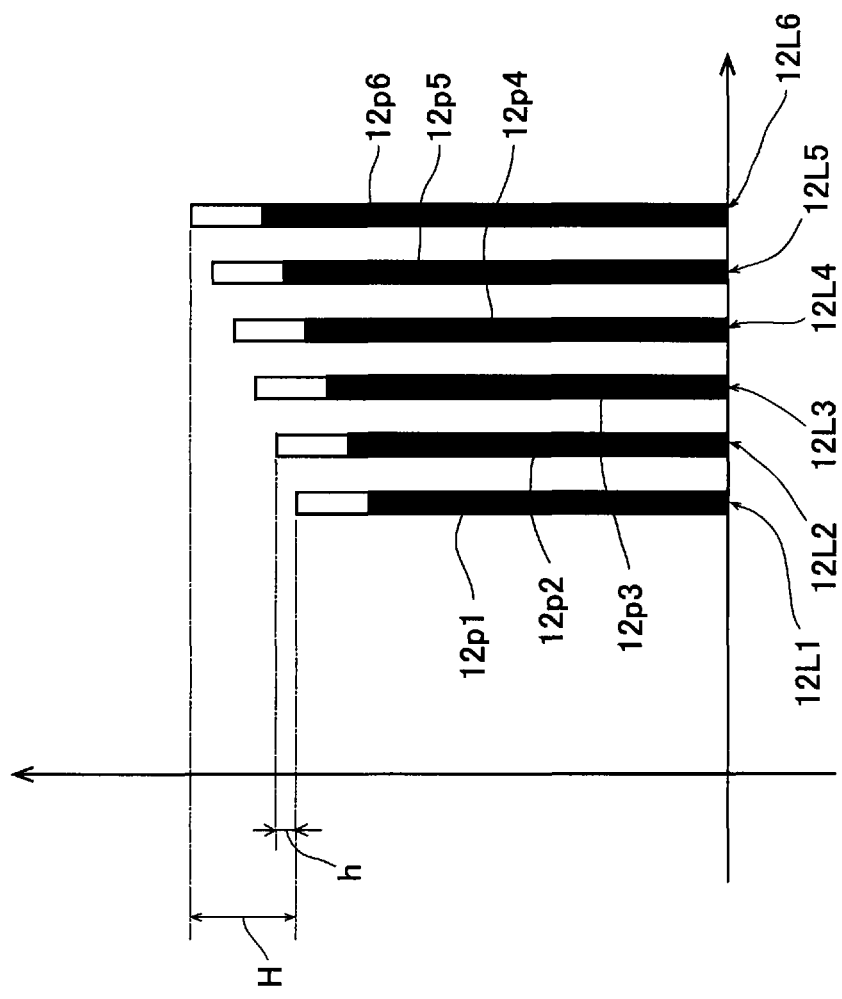
[Fig.4]

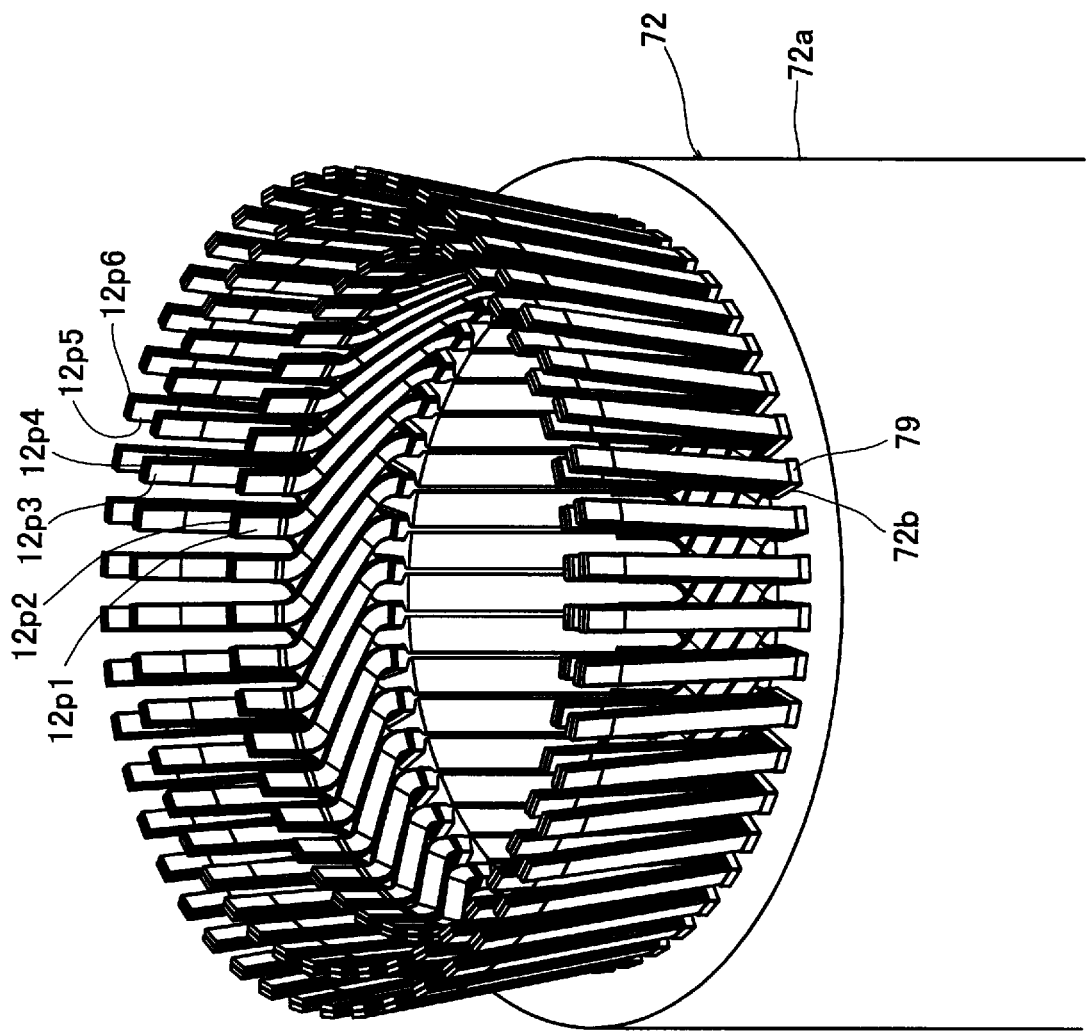
[Fig.5]

[Fig.6]
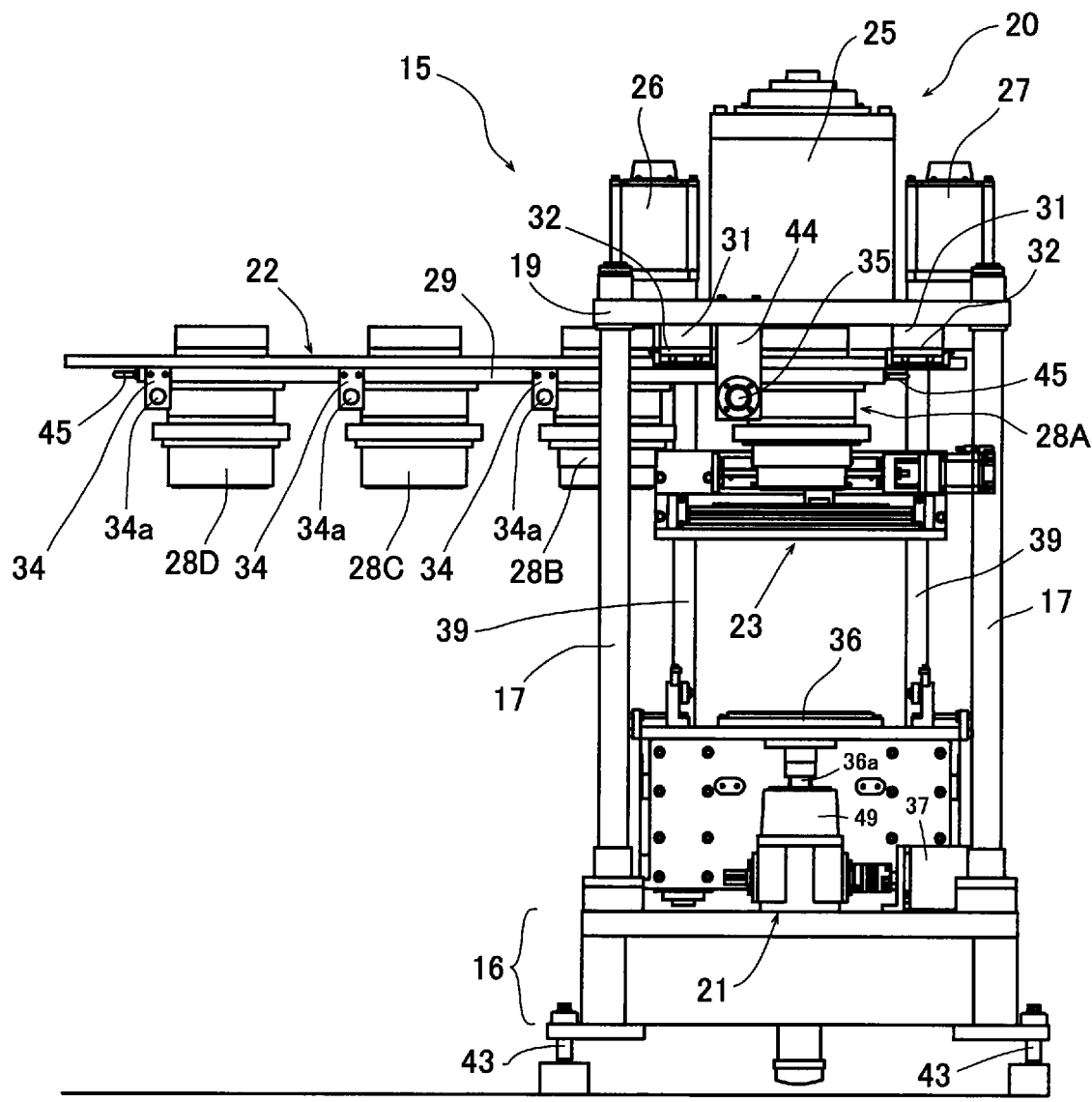

[Fig.7]
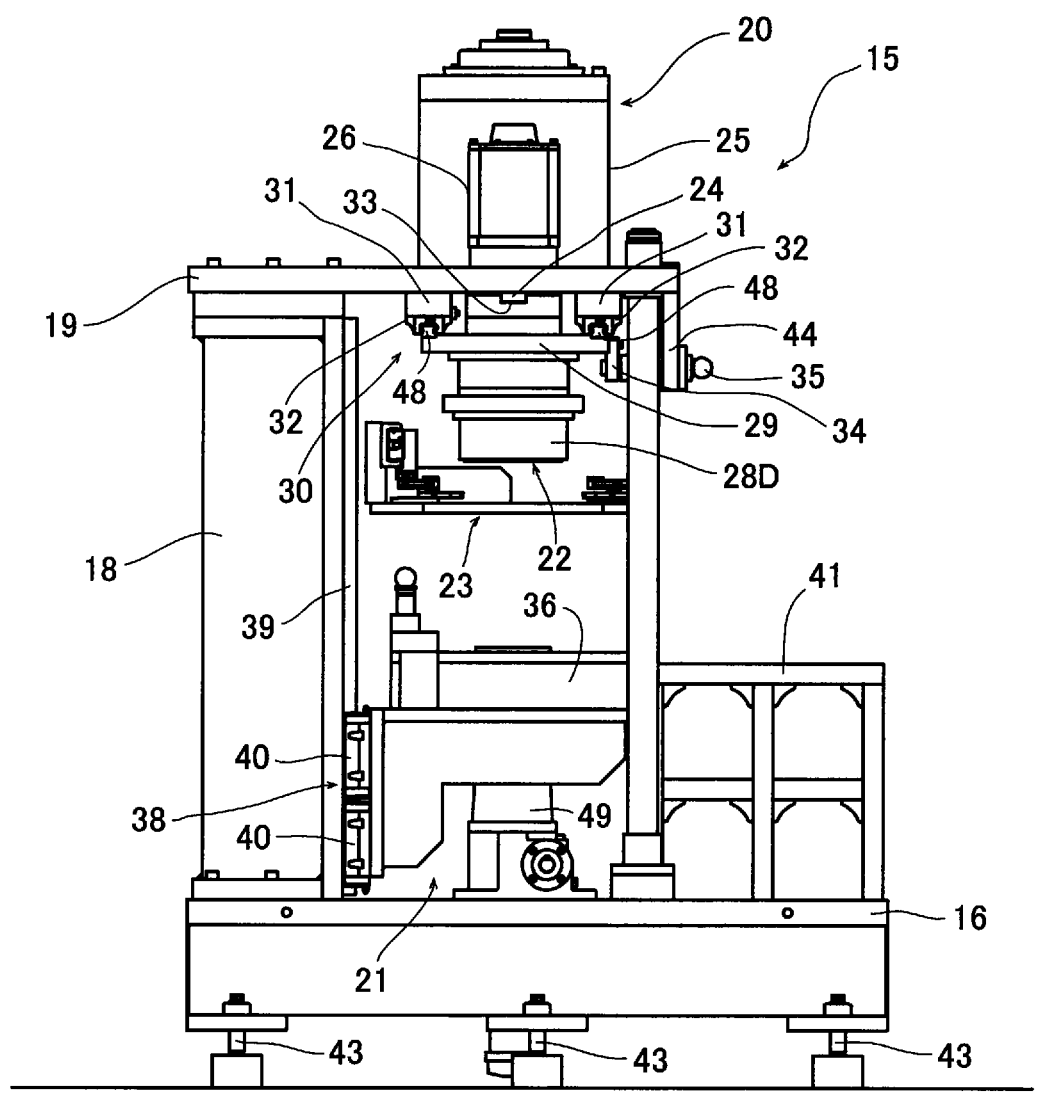

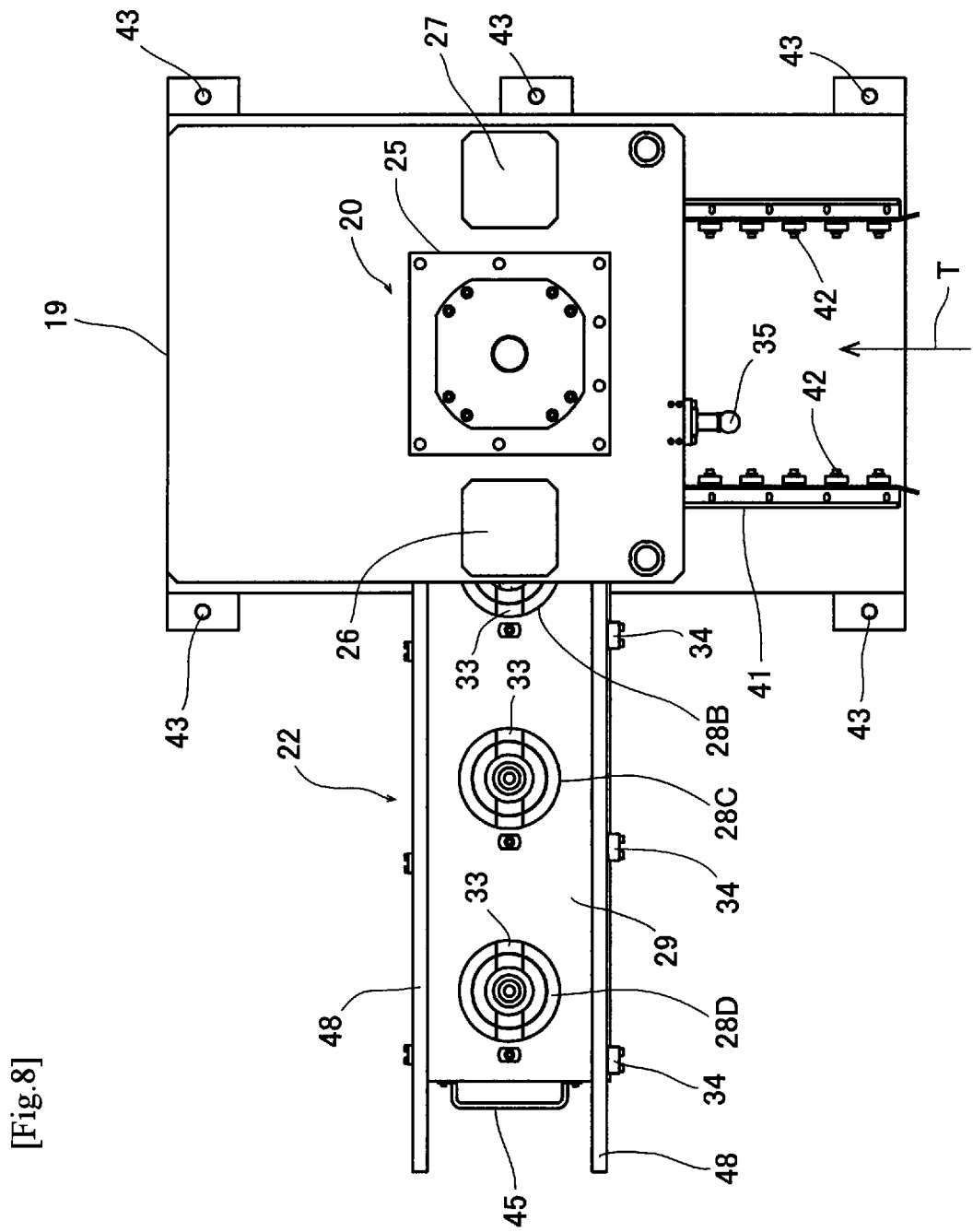
[Fig.8]

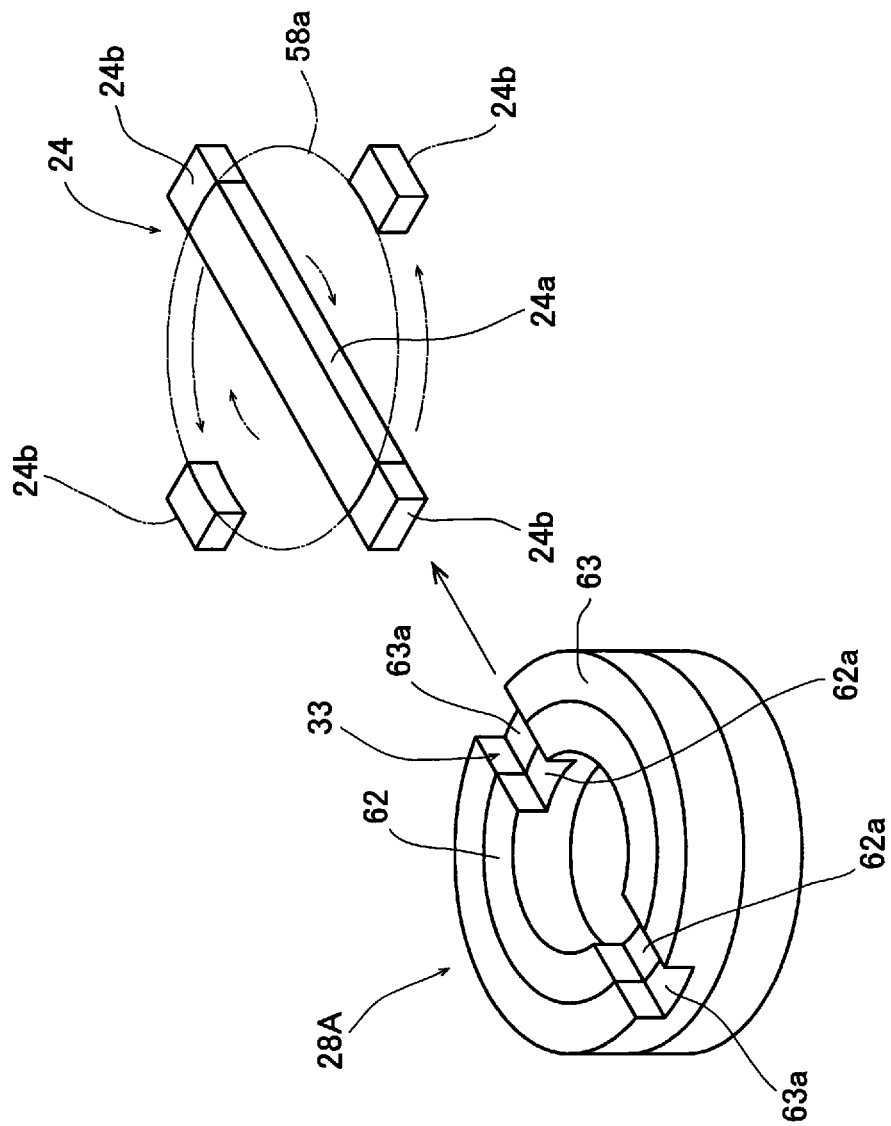
[Fig.9]

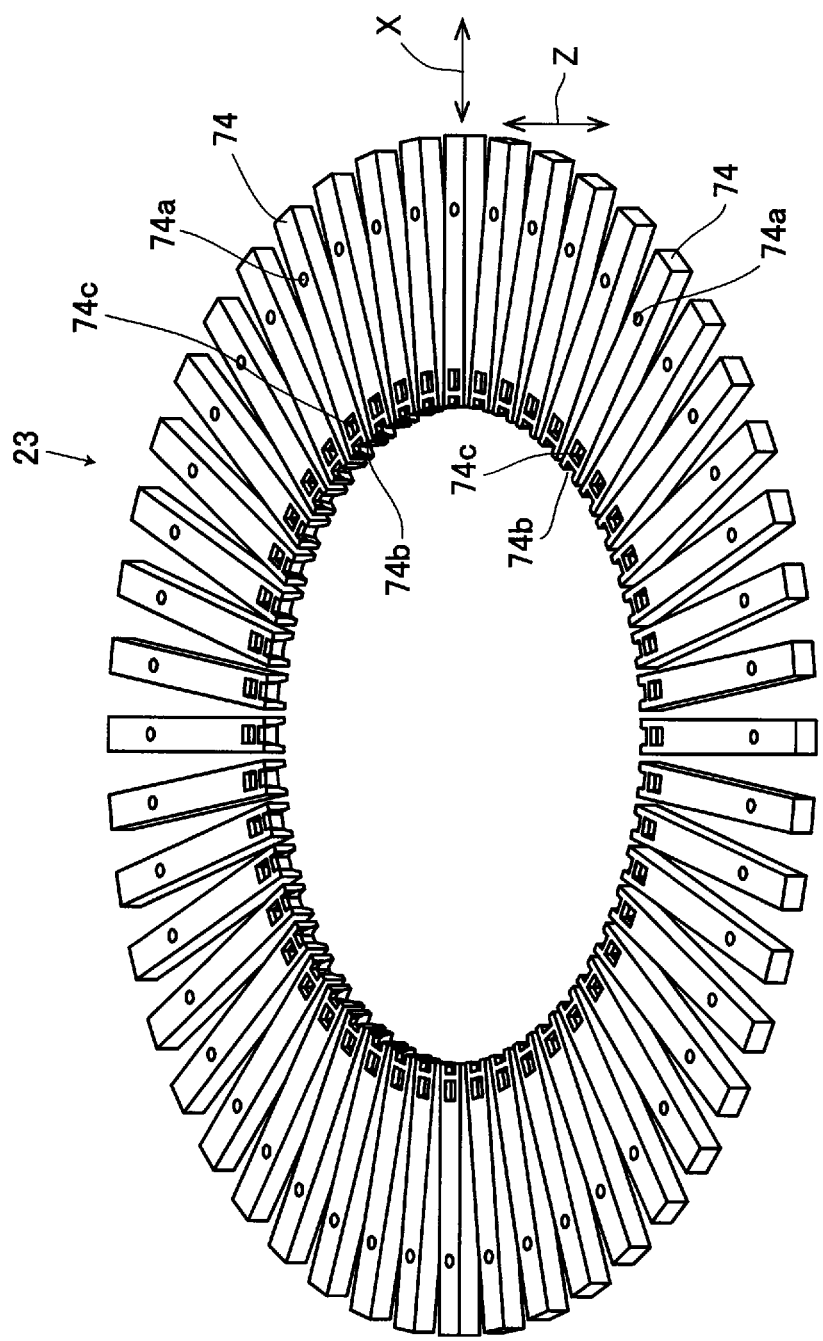
[Fig.10]

[Fig11A]
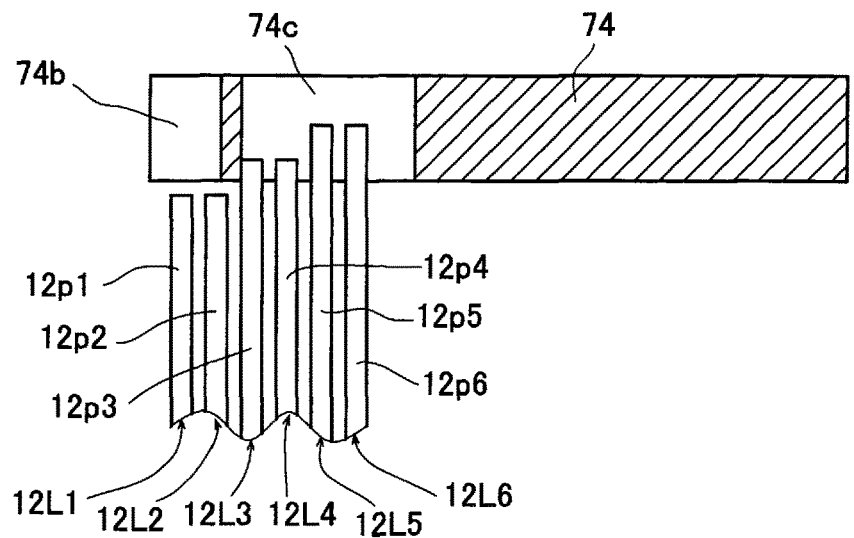
[Fig.11B]
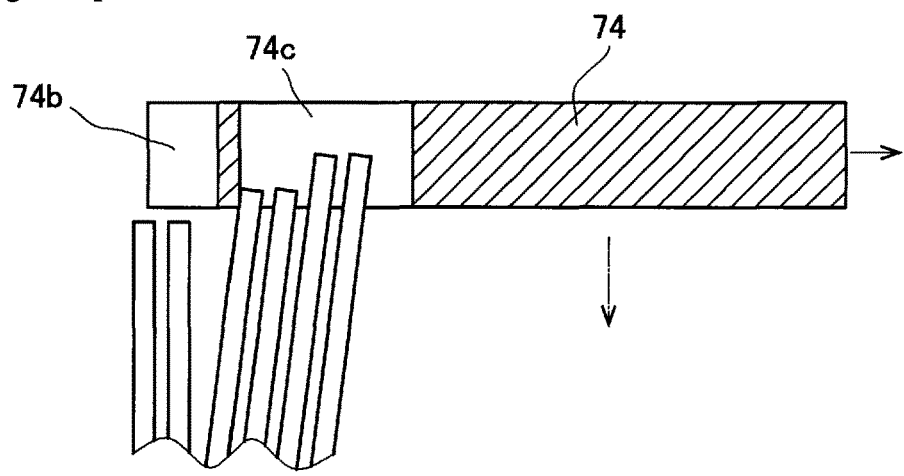
[Fig.11C]
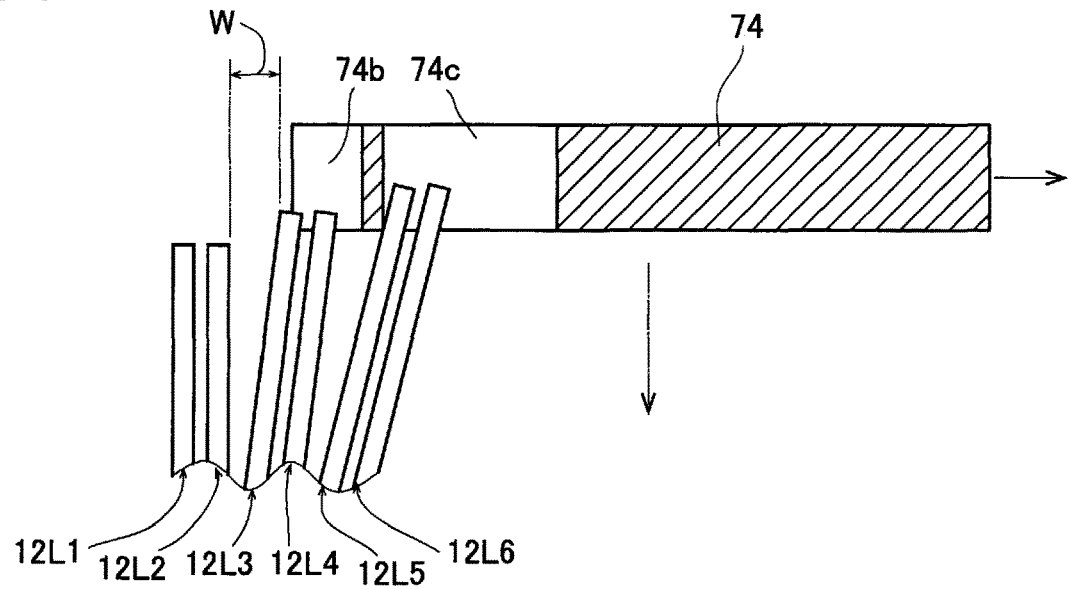

[Fig.12]
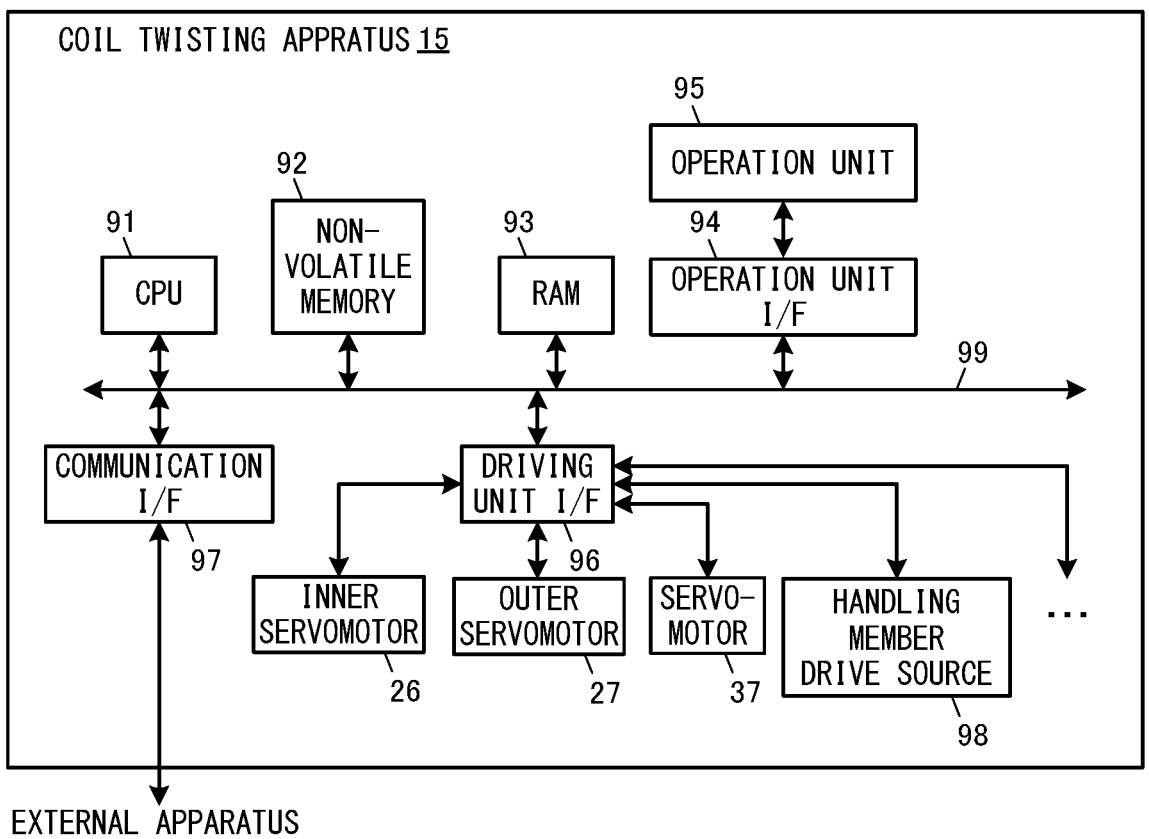

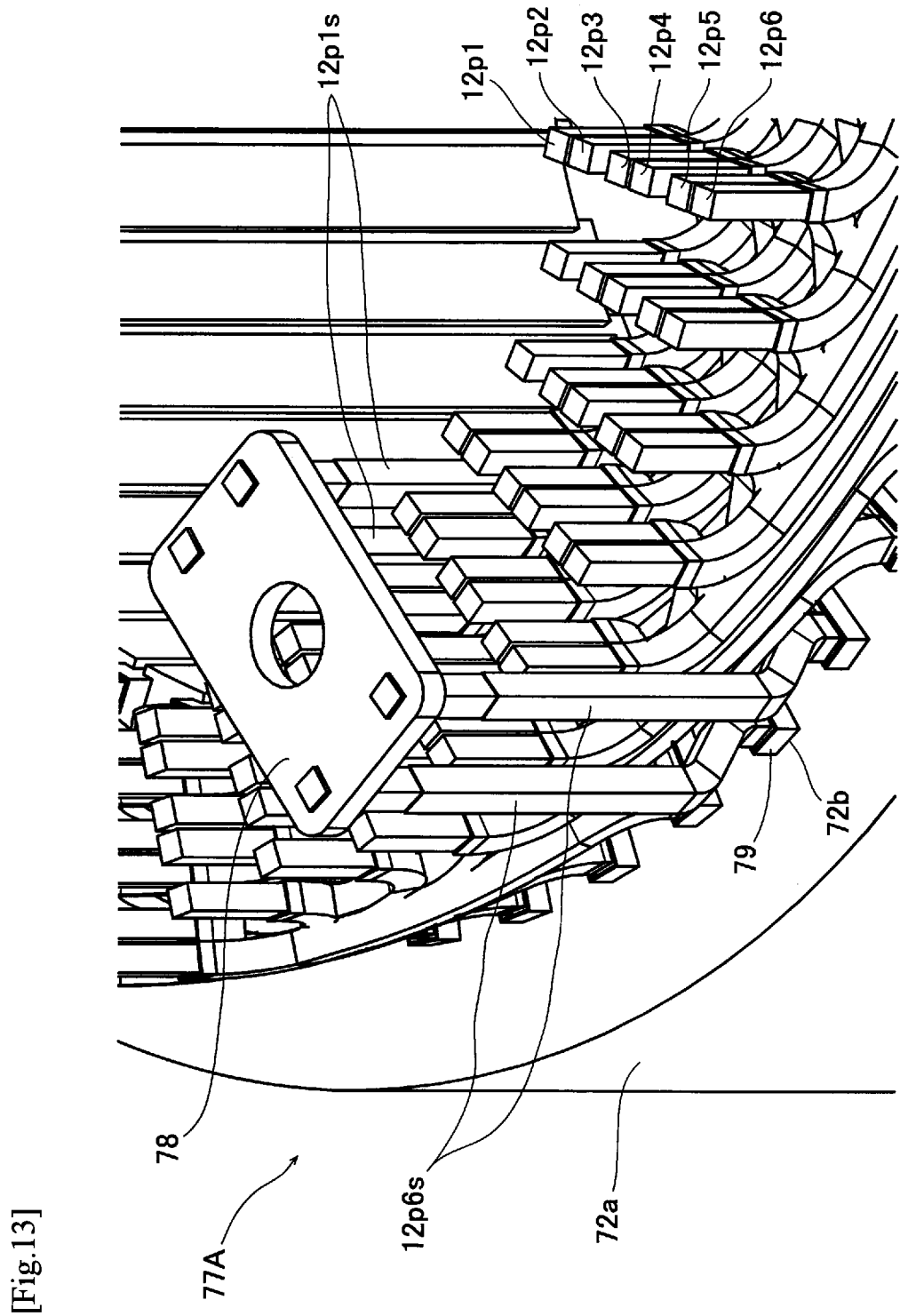
[Fig.13]

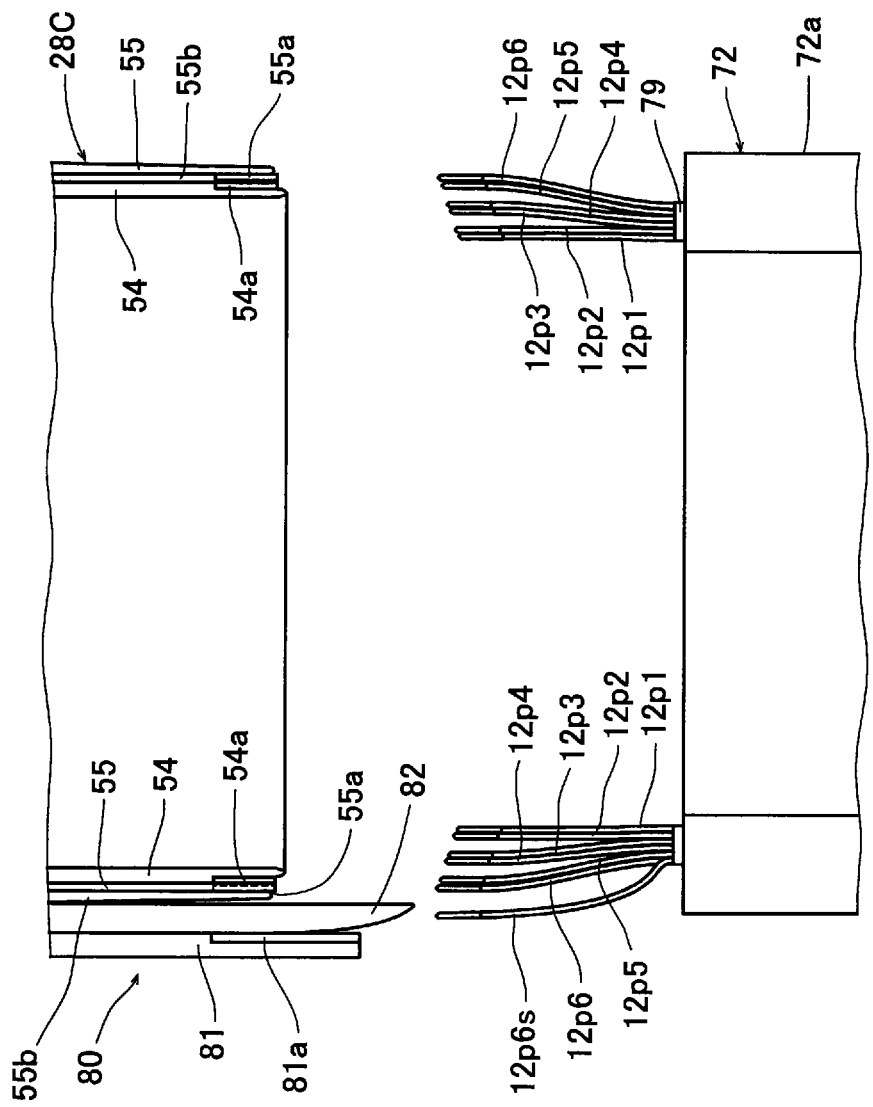

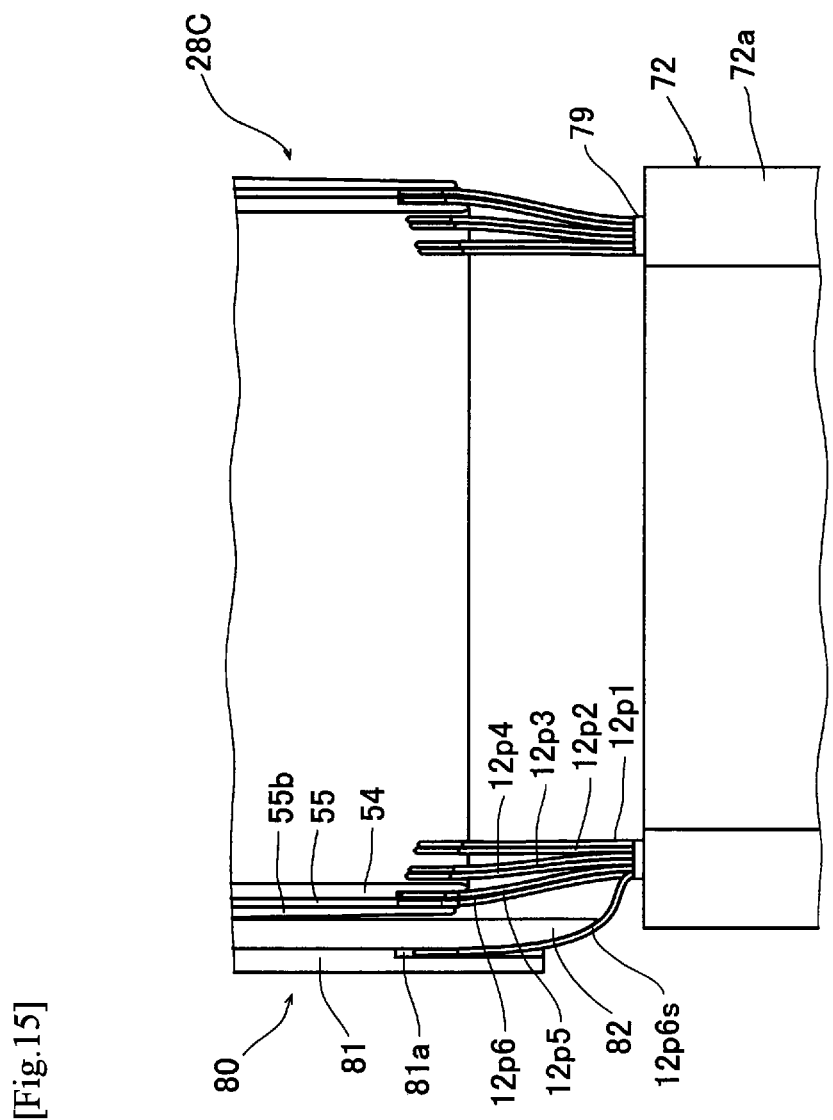
[Fig.15]

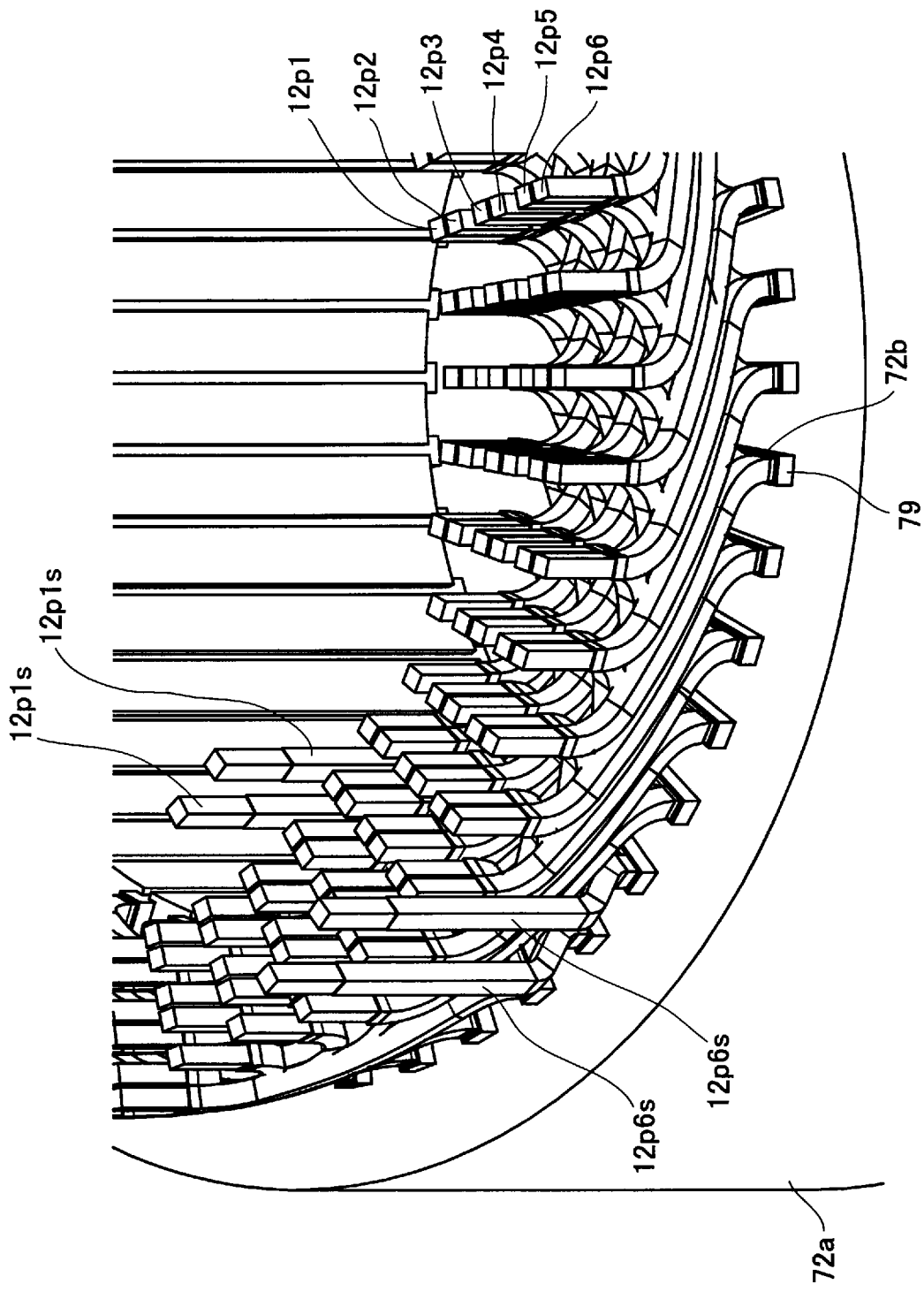
[Fig.16]

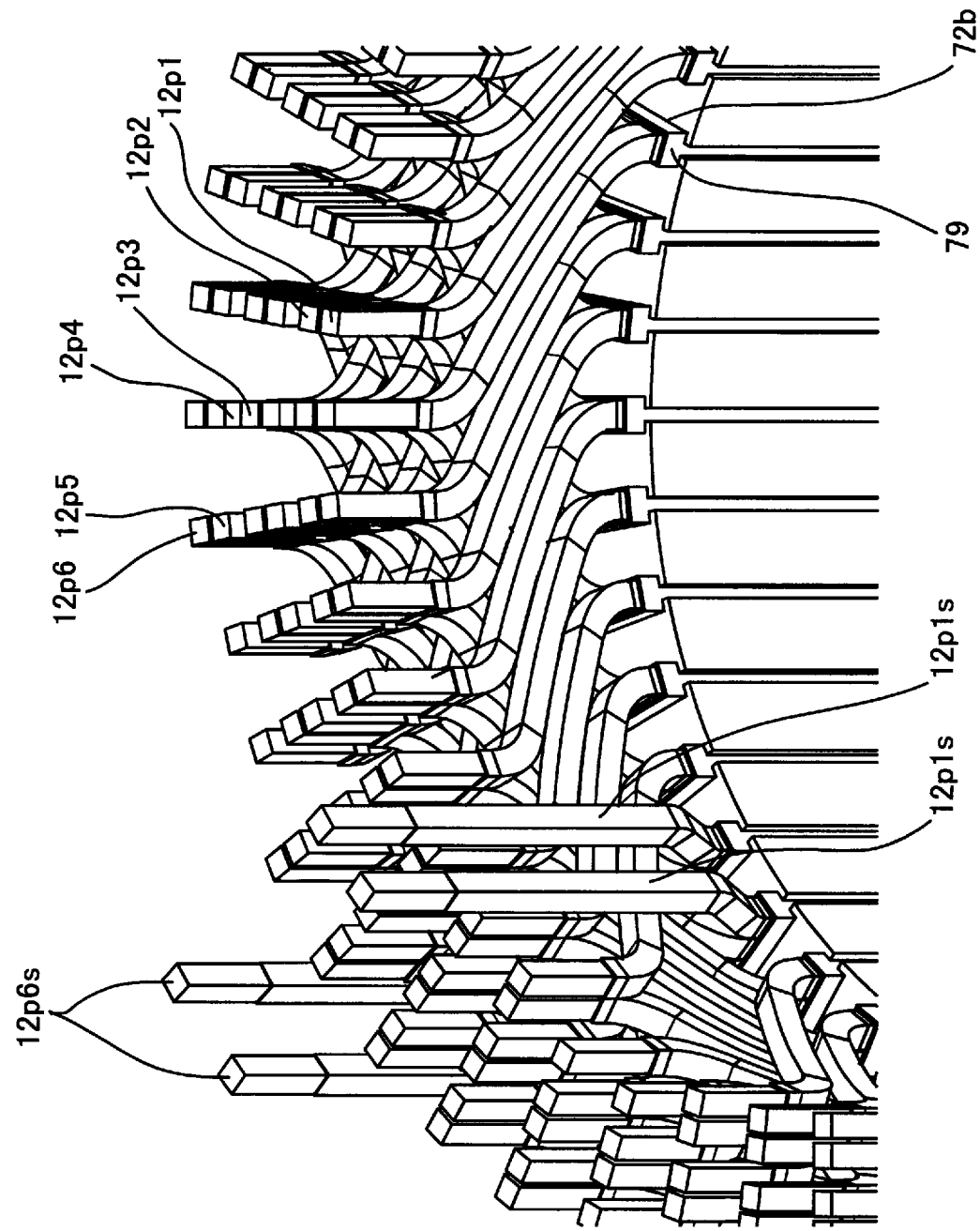
[Fig.17]

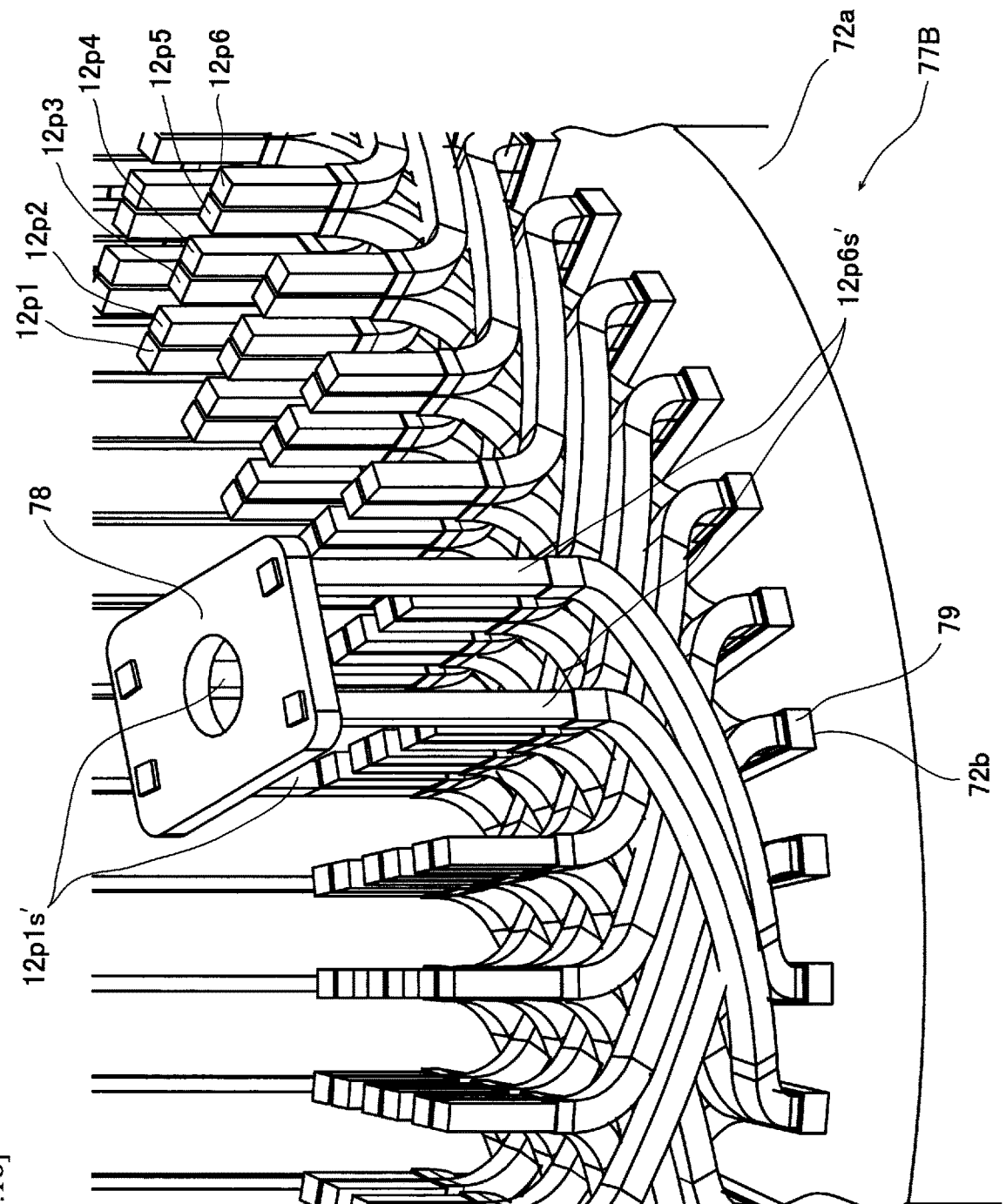
[Fig.18]

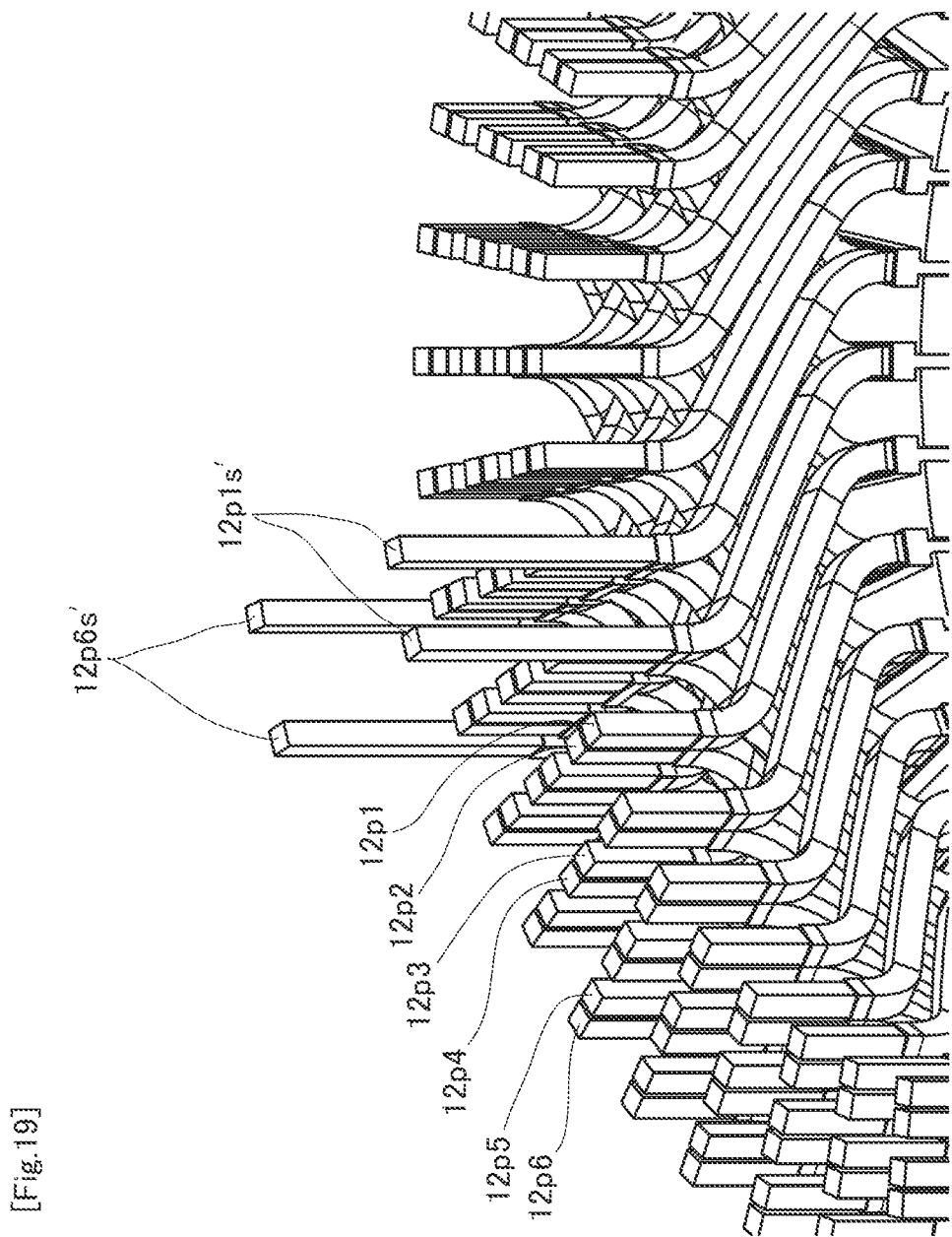
[Fig.19]

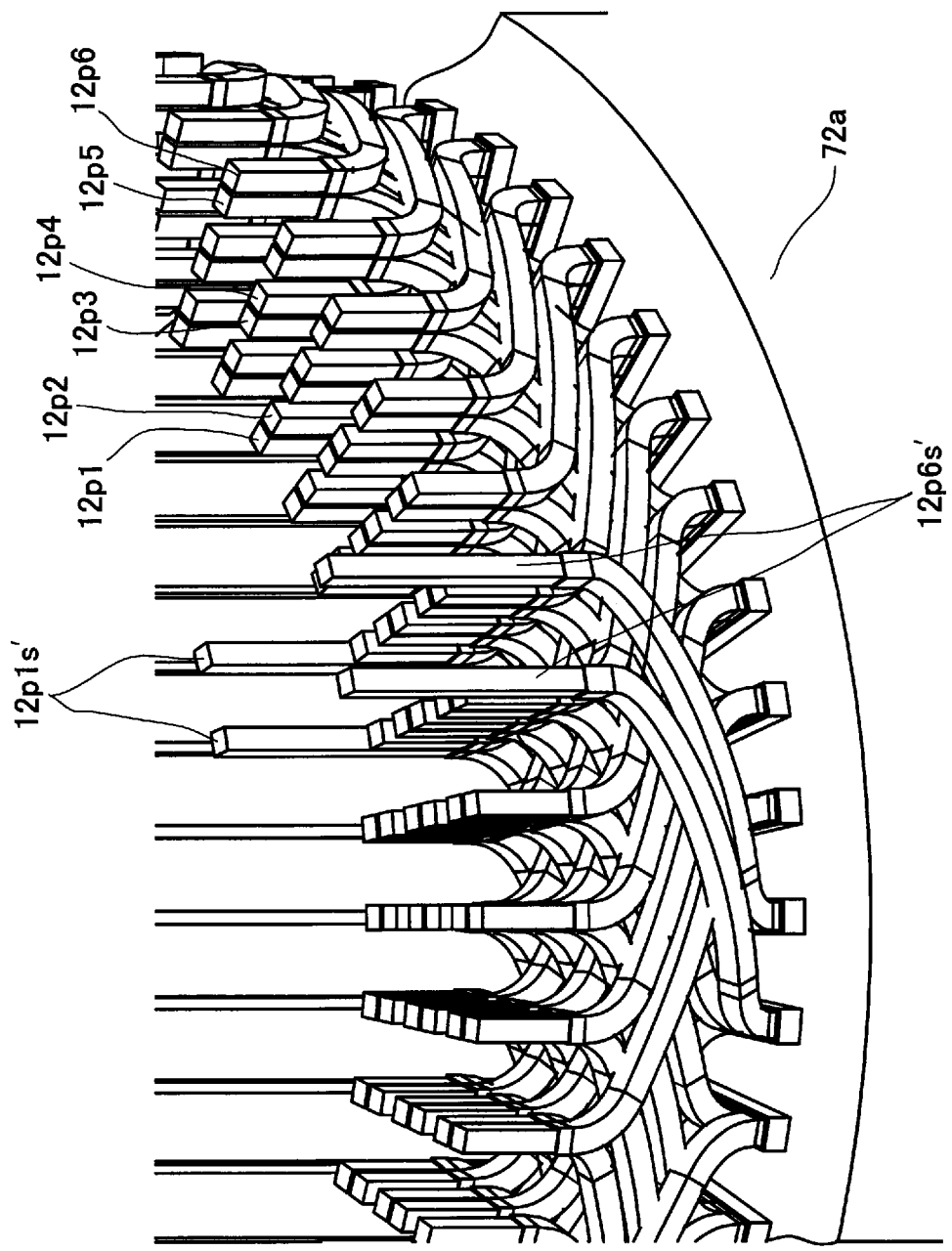
[Fig.20]

[Fig.21]
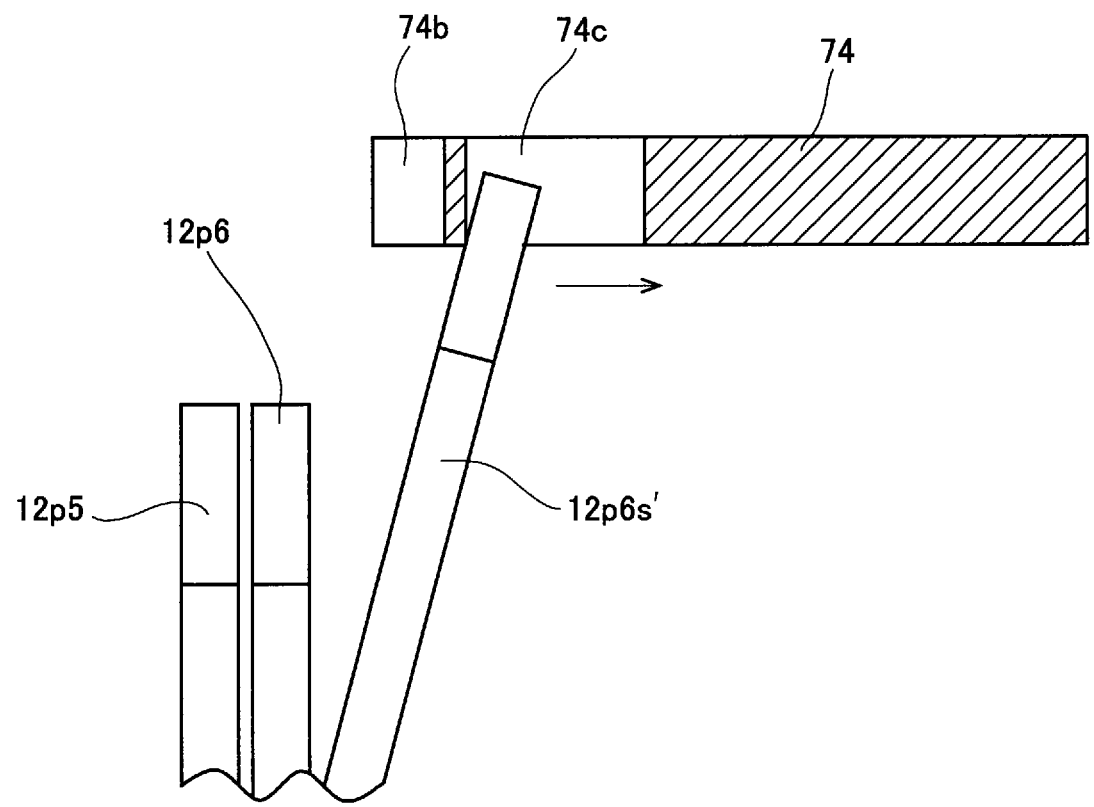

COIL SEGMENT PROCESSING METHOD, COIL SEGMENT PROCESSING APPARATUS AND CONNECTION STRUCTURE OF COIL SEGMENTS

TECHNICAL FIELD

The present invention relates to a coil segment processing method for twisting and bending end portions of coil segments protruding from an end face of a core of a stator or a rotor of an electrical rotating machine (rotating electric machine) such as a motor or a power generator, a coil segment processing device configured to perform the coil segment processing method, and a connection configuration of coil segments.

BACKGROUND ART

As a coil of a stator or a rotor in an electrical rotating machine, so-called segment type coil is well known. In such a segment type coil, a plurality of coil segments (hereinafter, simply referred to as "segment(s)") respectively formed by processing a linear wire rod of a predetermined length into a U-shape are inserted into a plurality of slots arranged along a circumferential direction of the stator or rotor, respectively, and the free end sides of these segments (end sides in the insertion direction; hereinafter referred to as "segment end portion(s)") are twisted and electrically connected to one another by welding or the like. Some of the plurality of segment end portions are connected as power supply lines. This type of coil segment is also referred to as a hairpin.

As the twisting process of the segment end portions of the segment type coils, for example, as shown in FIG. 5 and FIG. 6 of PTL1, it is known that a plurality of cylindrical (annular) twisting jigs having through holes or grooves for inserting the segment end portions therein are concentrically arranged, and the segment end portions of multiple layers are simultaneously twisted by rotating each of these jigs in a predetermined direction.

In PTL1, a four-layer configuration of accommodating four segments in every slot of the stator iron core is exemplified, and correspondingly, the twisting jig is configured such that four twisting jigs are concentrically arranged.

The apparatus of PTL1 is configured such that twisting jigs of the first layer and the third layer, from the center to the outside in the radial direction, are synchronously rotated in one direction, and twisting jigs of the second layer and the fourth layer are rotated synchronously in the opposite direction to the one direction. In other words, the configuration is such that the twisting jigs of adjacent layers in the radial direction are rotated in different directions to twist, and the segment end portions of all layers (four layers here) are simultaneously twisted.

In this type of twist process, the twisting jigs are rotated while moving the workpiece (a stator or a rotor) straight to the twisting jig side, that is, inserting the segment end portions into the twisting jig and pressing them.

CITATION LIST

Patent Literature

[PTL1] Japanese Patent Application Laid-Open Publication No. 2003-259613

SUMMARY OF INVENTION

Technical Problem

Here, in a coil configuration in which a plurality of segment layers spread concentrically, since the number of segments arranged in the circumferential direction is the same in each layer, the distance between the segments in the circumferential direction is different between the inner layers and the outer layers in the radial direction. Then, in order to electrically connect the segment end portions of the adjacent layers after twisting, it is necessary to increase the protrusion amount (length) of the segment end portions from the end face of the core as it goes outward in the radial direction. Depth of insertion holes or insertion grooves of each twisting jig is set corresponding to the variation in length of the segment end portions.

As described above, since the protrusion amount of the segment end portions from the end face of the core is different between the inner side and the outer side in the radial direction, a relationship characteristic between a straight movement of the workpiece and a rotation angle of the twisting jig at the time of the twisting (hereinafter, referred to as "twist characteristic") inevitably differs depending on the length of the segment end portions.

However, in the method described in PTL1, which simultaneously twists the segment end portions of a plurality of layers, twisting is performed in a state where the twisting characteristics are biased because the twisting jigs at different radial positions, in other words, the segment end portions with different twisting characteristics are synchronously rotated.

That is, when setting the rotation amount of the twisting jigs with reference to the twist characteristic of the segment end portions of the inner side in the radial direction, the rotation amount of the segment end portions of the outer side is insufficient and thus accuracy of the twisting decreases. Conversely, when setting the rotation amount of the twisting jigs with reference to the twist characteristic of the segment end portions of the outer side in the radial direction, the rotation amount of the segment end portions of the inner side is excessive and thus accuracy of the twisting decreases.

As a result, overall accuracy of the twisting was low. Lower accuracy of twisting affects also accuracy of connection between the segment end portions by welding or the like and connection (wiring) of the segment end portions for power supply lines or the like, thus resulting in a deterioration in a quality of the electrical rotating machine such as a motor.

Further, in the method described in PTL1, which simultaneously twists the segment end portions of a plurality of layers, since the adjacent layers in the radial direction are twisted in opposite directions, it was unavoidable that the distance between the segments for power supply lines in different layers becomes large (distant) after the twisting. Therefore, it was necessary to employ a complicated connection configuration of the power supply lines for electrically connecting a plurality of segments for power supply lines using long conductors extending in the circumferential direction. The complicated connection configuration of the power supply line leads to decreased reliability.

The invention has been developed in view of the above situation, for the purpose of enabling to accurately twist segment end portions of a plurality of coil segments inserted into slots of a core of a stator or a rotor, protruding from the end face of the core to form a plurality of layers. Another purpose of the invention is to realize a highly reliable electrical rotating machine.

Solution to Problem

In order to achieve the above purpose, in view of the fact that the conventional problem arises from simultaneous twisting of the layers from that on the inner side in the radial direction where the protrusion length of the segment end portion is the shortest to that on the outer side where the protrusion length of the segment end portion is the longest, the present invention performs the twisting as a process divided into several times, and as a result, good twist accuracy over all the layers is obtained.

Namely, a coil segment processing method according to the present invention is a coil segment processing method for processing a plurality of coil segments inserted into slots of a core of a stator or a rotor, comprising performing twisting to the plurality of coil segments inserted into the slots such that segment end portions that are end portions of the respective coil segments protruding from an end face of the core form a plurality of layers in a radial direction of the core, using a plurality of twisting jig units respectively comprising a smaller number of twisting jigs than total number of the plurality of the layers, the twisting jigs being concentrically disposed, each of the twisting jigs corresponding to any one of the plurality of layers respectively and comprising accommodating portions configured to respectively accommodate the segment end portions of the corresponding layer, wherein the twisting comprises a twist process of accommodating, into the accommodating portions of each twisting jig of one of the plurality of twisting jig units, the segment end portions of each layer corresponding to the each twisting jig, respectively, and rotating the each twisting jig so as to twist the accommodated segment end portions, and wherein the twisting comprises sequentially performing the twist process using each of the plurality of twisting jig units so as to twist segment end portions of all of the layers.

In this coil segment processing method, it is conceivable that the twisting process using a first twisting jig corresponding to a predetermined layer among the twisting jigs is performed in a state that a position in the radial direction of a particular segment end portion among a plurality of segment end portions of the predetermined layer is shifted to a position different from that of other segment end portions of the predetermined layer so that the particular segment end portion is not accommodated into any of the accommodating portions of the first twisting jig.

In this case, it is conceivable to selectively push the particular segment end portion by a pushing member to a position where the particular segment end portion does not interfere at least with the first twisting jig during the twist process using the first twisting jig, prior to the twist process using the first twisting jig.

It is conceivable that the pushing by the pushing member is performed after displacing the particular segment end portion in the radial direction by a displacing member different from the pushing member.

It is conceivable that the coil segment processing method comprises expanding a space in the radial direction between the segment end portions of each layer to be twisted by a twisting jig unit including the first twisting jig and the segment end portions of other layers, prior to the accommodating of the segment end portions into the accommodating portions of the first twisting jig, wherein a member that interferes with the segment end portions and moves the segment end portions in the expanding is used as the displacing member.

It is conceivable that the predetermined layer is an outermost layer and/or an innermost layer in the radial direction among the plurality of layers.

It is conceivable that: a first long segment end portion exists in an innermost layer in the radial direction, the first long segment end portion protruding from the end face of the core longer than other segment end portions of the innermost layer; and a second long segment end portion exists in an outermost layer in the radial direction, the second long segment end portion protruding from the end face of the core longer than other segment end portions of the outermost layer; the twist process regarding the innermost layer is performed using a first twisting jig corresponding to the innermost layer such that the first long segment end portions and said other segment end portions of the innermost layer are twisted in a same twisting direction; and the twist process regarding the outermost layer is performed such that, after shifting a position in the radial direction of the second long segment end portion to a position different from that of other segment end portions of the outermost layer, said other segment end portions of the outermost layer are twisted in a twisting direction opposite to the twisting direction of the segment end portions of the innermost layer using a second twisting jig corresponding to the outermost layer, and then the second long segment end portion is twisted in a direction same as the twisting direction of the segment end portions of the innermost layer using a third twisting jig other than the second twisting jig so that the second long segment end portion almost opposes to the first long segment end portion.

It is conceivable, regarding each of the plurality of the twisting jig units, to expand a space in the radial direction between the segment end portions of each layer twisted by the twisting jig unit and the segment end portions of other layers, prior to the accommodating of the segment end portions into the accommodating portions of twisting jigs of the twisting jig unit.

It is conceivable that each of the plurality of twisting jig units is held by a unit holder which is movably supported, and that when performing the twist process using each of the plurality of twisting jig units, a twisting jig unit to be used for the twist process is changed by moving the unit holder and connecting one twisting jig unit selected among the plurality of twisting jig units with a rotary drive mechanism to rotate each twisting jig of the selected one twisting jig unit.

Further, a coil segment processing apparatus according to the present invention is a coil segment processing apparatus configured to process a plurality of coil segments inserted into slots of a core of a stator or a rotor, the plurality of coil segments being inserted into the slots such that segment end portions that are end portions of the respective coil segments protruding from an end face of the core form a plurality of layers in a radial direction of the core, comprising: a plurality of twisting jig units respectively comprising a smaller number of twisting jigs than total number of the plurality of the layers, the twisting jigs being concentrically disposed, each of the twisting jigs corresponding to any one of the plurality of layers respectively and comprising accommodating portions configured to respectively accommodate the segment end portions of the corresponding layer; a driving mechanism configured to move one twisting jig unit and/or the core with the coil segments inserted thereinto so as to accommodate, into the accommodating portions of each twisting jig of the one twisting jig unit selected from the plurality of the twisting jig units, the segment end portions of layers corresponding to the each twisting jig, respectively; and a rotary drive mechanism connectable to a twisting jig unit arbitrarily selected from the plurality of the twisting jig units and configured to rotate each twisting jig of a twisting jig unit connected thereto in a rotating direction opposite to that of radially adjacent twisting jig.

It is conceivable that the coil segment processing apparatus comprises a pushing member configured to selectively push a particular segment end portion among a plurality of segment end portions of a predetermined layer among the plurality of the layers to a position where the particular segment end portion does not interfere at least with a first twisting jig corresponding to the predetermined layer so that the particular segment end portion is not accommodated into any of accommodating portions of the first twisting jig even when the segment end portions of the predetermined layer are to be accommodated into the accommodating portions of the first twisting jig by the driving mechanism.

It is conceivable that the predetermined layer is an outermost layer and/or an innermost layer in the radial direction among the plurality of layers.

It is conceivable that the coil segment processing apparatus comprises a unit holder that is movably supported and configured to hold each of the plurality of twisting jig units, wherein one twisting jig unit selected among the plurality of twisting jig units is connected with the rotary drive mechanism due to movement of the unit holder.

It is conceivable that a concave portion is formed on either one of the rotary drive mechanism and the plurality of the twisting jig units, and a convex portion to be fitted to the concave portions is formed on the rotary drive mechanism or the plurality of the twisting jig units to be connected to the either one, and that rotary driving force is transmitted from the rotary drive mechanism to the twisting jig unit connected to the rotary drive mechanism through connection between the concave portion and the convex portion due to the movement of the unit holder.

It is conceivable that, in at least one twisting jig unit among the plurality of the twisting jig units, an axis of one twisting jig comprised in the at least one twisting jig unit passes through an axis of another twisting jig comprised in the at least one twisting jig unit.

It is conceivable that the coil segment processing apparatus comprises an interlayer spacing mechanism configured to expand a space in the radial direction between the layers with each number of layers to be twisted using one twisting jig unit.

It is conceivable that the interlayer spacing mechanism comprises a plurality of handling members disposed radially to correspond to the respective slots and integrally movable in the radial direction, and configured to interfere with segment end portions inserted to the corresponding slots so as to move the segment end portions respectively.

Further, a connection structure of coil segments according to the present invention comprises: a core of a stator and/or a rotor; and a plurality of coil segments inserted into slots of the core, the plurality of coil segments being inserted into the slots such that segment end portions that are end portions of the respective coil segments protruding from an end face of the core form a plurality of layers in a radial direction of the core, wherein the segment end portions include: first segment end portions twisted in a circumferential direction of the core; and second segment end portions extending in an axial direction of the core from an end of the core, and the second segment end portions substantially opposing to each other in the radial direction are connected with each other via a conductor.

Another connection structure of coil segments according to the present invention comprises: a core of a stator and/or a rotor; and a plurality of coil segments inserted into slots of the core, the plurality of coil segments being inserted into the slots such that segment end portions that are end portions of the respective coil segments protruding from an end face of the core form a plurality of layers in a radial direction of the core, wherein the segment end portions include short segment end portions and long segment end portions protruding longer from the end face of the core than the short segment end portion of same layer, a first long segment end portion existing in a first layer among the plurality of layers is twisted, in a circumferential direction of the core, in same twisting direction as a twisting direction of the short segment end portions of the first layer, a second long segment end portion existing in a second layer different from the first layer among the plurality of layers is twisted, in a circumferential direction of the core, in same twisting direction as the twisting direction of the first long segment end portion that is opposite to a twisting direction of the short segment end portions of the second layer, and the first long segment end portion and the second long segment end portion substantially oppose to each other in the radial direction and are connected with each other via a conductor.

Effect of the Invention

According to the present invention, it is possible to accurately twist segment end portions of a plurality of coil segments inserted into slots of a core of a stator or a rotor, protruding from an end face of a core to form a plurality of layers. Further, it is possible to realize a highly reliable electrical rotating machine.

BRIEF DESCRIPTION OF DRAWINGS

FIG. 1 is a diagram showing an example of a twisting procedure by a coil twisting apparatus according to a first embodiment of the present invention, wherein (a), (c), and (e) denote plan views of the twisting jig units used in each step, and (b), (d), and (f) denote cross-sectional views corresponding to those.

FIG. 2 is an exploded perspective view showing a twisting jig of the coil twisting apparatus according to the first embodiment.

FIG. 3 is a perspective view showing a main part of the workpiece set in the coil twisting apparatus according to the first embodiment of the present invention, showing a state before twisting.

FIG. 4 is a schematic diagram to explain that height of the coil segments of the workpiece according to the first embodiment differs in the radial direction.

FIG. 5 is a perspective view showing a state in which inner two layers of the workpiece shown in FIG. 3 have been twisted by the coil twisting apparatus according to the first embodiment.

FIG. 6 is a schematic front view of the coil twisting apparatus according to the first embodiment.

FIG. 7 is a schematic side view of the coil twisting apparatus according to the first embodiment.

FIG. 8 is a schematic plan view of the coil twisting apparatus according to the first embodiment.

FIG. 9 is a perspective view showing main part of a configuration relating to mating between a rotary drive mechanism and a twisting jig unit of the coil twisting apparatus according to the first embodiment.

FIG. 10 is a perspective view of main part of an interlayer spacing member provided in the coil twisting apparatus according to the first embodiment.

FIG. 11A is a diagram illustrating a handling operation by the interlayer spacing member shown in FIG. 10, showing a state in which the handling members are aligned.

FIG. 11B is continuation of FIG. 11A, a view showing a state in which the handling members are moved outward in the radial direction to expand a space between the first and second layers and the third and fourth layers.

FIG. 11C is continuation of FIG. 11B, a view showing a state in which the handling members are moved outward in the radial direction to expand a space between the third and fourth layers and the fifth and sixth layers.

FIG. 12 is a diagram showing a configuration of a control unit of the coil twisting apparatus according to the first embodiment.

FIG. 13 is a perspective view showing an example of a connection configuration of power supply lines according to a second embodiment of the present invention.

FIG. 14 is a view showing a twisting jig and a pushing member used in the second embodiment, as a schematic sectional view showing a state before inserting the segment end portions.

FIG. 15 is a view showing the twisting jig and the pushing member used in the second embodiment, as a schematic sectional view showing a state after inserting the segment end portions.

FIG. 16 is a perspective view showing main part of the core after twisting according to the second embodiment, viewed from the outer side.

FIG. 17 is a perspective view showing main part of the core after twisting according to the second embodiment, viewed from the inner side.

FIG. 18 is a perspective view showing a connection configuration of power supply lines according to a modification example of the second embodiment.

FIG. 19 is a perspective view showing main part of the core after twisting according to the modification example of the second embodiment, viewed from the inner side.

FIG. 20 is a perspective view showing main part of the core after twisting according to the modification example of the second embodiment, viewed from the outer side.

FIG. 21 is a side view showing main part of another example of the displacing member in the second embodiment.

DESCRIPTION OF EMBODIMENTS

Hereinafter embodiments of the present invention will be described with reference to the drawings. First, a first embodiment will be described with reference to FIG. 1 to FIG. 11C.

An example of an object of twisting by a later-described coil twisting apparatus that is one embodiment of a coil segment processing apparatus is, as shown in FIG. 3, portions protruding from an end face of a core 72a among U-shaped coil segments inserted into slots 72b of a stator 72 (hereinafter, also referred to as "workpiece") with insulating papers 79 between them, i.e. a group of segment end portions 12p (when not specifying an individual of the segment end portion, reference sign "12p" is used).

Each coil segment used here has U-shape in which two linear slot insertion portions to be inserted into the slots 72b are connected via a linking portion bent in a crank shape. In a state shown in FIG. 3, respective slot insertion portions are inserted into different slots 72b, and the segment end portions 12p which are end portions of respective slot insertion portions protruding from an end face of the core 72a form a plurality of layers (here, six layers) in the radial direction of the core 72a. This "layer" is also referred to as a "segment layer" hereinafter. Two segment end portions 12p in one coil segment may belong to different segment layers.

In FIG. 3, the reference sign 12p1 indicates a segment end portion in the innermost layer, and the reference sign 12p6 indicates a segment end portion in the outermost layer. This example shows an example that the number of the coil segment layers is six, but the present invention is not limited thereto. In a coil segment processing method of the present embodiment, each two adjacent layers in the radial direction of the core 72a is twisted through a twist process using a separate twisting jig unit in sequence from the inner side, and in the case of six layers, the twist process is performed three times in total.

That is, the segment end portions of all the layers are twisted by performing a plurality of twist process over the entire plurality of layers while changing the twisting jig units.

As described above, in the coil configuration in which a plurality of segment layers (here, six layers) extend concentrically, since the arrangement number of segments in the circumferential direction is the same for each layer, the distance between the segments in the circumferential direction is different between radially inner layers and outer layers.

Therefore, in order to enable connection between segment end portions of different layers after the twisting, amount of protrusion (height) of the segment end portions from the end face of the core should be increased toward the outside in the radial direction.

As shown in FIG. 4, difference in height between the innermost segment layer 12L1 and the adjacent segment layer 12L2 is h, and the difference in height between the innermost segment layer 12L1 and the outermost segment layer 12L6 is H, for example, about five times as much as h. In the following description, the segment layer 12Ln is also referred to as an "n-th layer".

When twisting the segment layers 12L1 to 12L6, it is conceivable to synchronously rotate the segment layers 12L1, 12L3, and 12L5 in the same direction, and synchronously rotate the segment layers 12L2, 12L4, and 12L6 in the opposite direction to the above, so that all the layers are twisted simultaneously.

Such twisting can be performed by rotating the twisting jigs while raising the workpiece toward the twisting jigs. However, good twisting accuracy in all layers cannot be obtained with this method because the twist characteristics vary depending on the difference in the amount of protrusion of the segment end portion as described above.

In FIG. 4, the segment end portions of each layer are shown only in a partial region. In addition, spaces between the layers are enlarged for ease of understanding. The upper end portions (white portions) of each segment end portions 12p1 to 12p6 show peeled-off portions where insulation coating thereof is peeled off. The coil segments except of the peeled-off portions are covered with the insulation coating. As long as insulation is possible, a member other than the insulation coating may be adopted.

As shown in FIG. 4, the difference h of the height between segment end portions of adjacent layers in the radial direction of the core is extremely small. Hence it can be said that influence on the twisting accuracy because of the difference in height is little, even if these layers are twisted at the same time.

The present invention focuses on this point and performs the twist process causing very little influence because of the difference in height between the segment end portions, over all the layers by dividing the twisting into multiple times, in order to improve the twisting accuracy and, consequently, output of the motor including the manufactured coil, even though it takes a certain amount of time.

In the present embodiment, two layers adjacent to each other in the radial direction of the core are handled as one group, and twist process is performed three times. Therefore, the twist processing of the innermost segment layer 12L1 and the segment layer 12L2 adjacent thereto is firstly performed at the same time such that the respective twisting directions are opposite to each other in adjacent layers in the radial direction of the core.

The state after this twist process is shown in FIG. 5. Next, as will be described later, the twisting jig unit is replaced with another twisting jig unit having different diameters (D1 to D6), and twist process of the segment layer 12L3 and the adjacent segment layer 12L4 is performed at the same time so that the respective twist directions are opposite to each other in adjacent layers in the radial direction of the core. Next, the twisting jig unit is similarly replaced with still another twisting jig unit having different diameters and twist process of the segment layer 12L5 and the adjacent segment layer 12L6 is performed at the same time so that the respective twist directions are opposite to each other in adjacent layers in the radial direction of the core.

The above-mentioned three twist processes will be described in detail with reference to FIG. 1. As shown by (a) and (b) in FIG. 1, firstly, the segment layer 12L1 and the adjacent segment layer 12L2 are simultaneously twisted to opposite directions using the twisting jig unit 28A The twisting jig unit 28A includes: an inner twisting jig 50, corresponding to the segment layer 12L1 to which the segment end portions 12p1 of the innermost segment layer 12L1 are inserted; and an outer twisting jig 51, corresponding to the segment layer 12L2, to which the segment end portions 12p2 of the segment layer 12L2 are inserted.

As shown in FIG. 2, the inner twisting jig 50 is in a cylindrical shape. A plurality of mounting holes 50b for fixing the inner twisting jig 50 to the body of the twisting jig unit 28A described later and an insertion hole 50c for a rotary shaft are formed on the upper surface 50a of the inner twisting jig 50.

Insertion grooves 50d as accommodating portions configured to receive insertion of respective segment end portions 12p1 of the segment layer 12L1 are formed in the same number as the number of the segments, at equal intervals in the circumferential direction, on the outer peripheral surface of the lower end portion of the inner twisting jig 50.

An outer twisting jig 51 has a cylindrical shape fitted to the outer surface of the inner twisting jig 50. A flange portion 51a for fixing the outer twisting jig 51 to the body of the twisting jig unit 28A is formed at the upper end of the outer twisting jig 51. A plurality of mounting holes 51b are formed at equal intervals in the circumferential direction in the flange portion 51a.

Insertion grooves 51c as accommodating portions configured to receive insertion of respective segment end portions 12p2 of the segment layer 12L2 are formed in the same number as the number of the segments, at equal intervals in the circumferential direction, on the inner peripheral surface of the outer twisting jig 51.

It is possible to insert (accommodate) the segment end portions 12p1 of the segment layer 12L1 into the insertion grooves 50d of the inner twisting jig 50 and insert (accommodate) the segment end portions 12p2 of the segment layer 12L2 into the insertion grooves 51c of the outer twisting jig 51 by moving the twisting jig unit 28A and/or the work 72, whereby relatively bringing the twisting jig unit 28A and the work 72 closer.

In the present embodiment, a method is employed in which the work 72 is raised by a lifting mechanism described later, and respective segment end portions 12p1, 12p2, are inserted into the inner twisting jig 50 and the outer twisting jig 51 of the twisting jig unit 28A fixed on the upper side. Namely, saving of energy is attempted by moving the lightweight configuration side.

The twist process is performed by rotating the inner twisting jig 50 and the outer twisting jig 51 while raising the workpiece 72. That is, the twisting jig unit 28A is connected to a rotary drive mechanism described later to transmit its driving force, and as shown by (a) in FIG. 1, for example, the inner twisting jig 50 is driven to rotate in a clockwise direction (direction of arrow R1), the outer twisting jig 51 is driven to rotate in a counterclockwise direction (direction of arrow R2) which is the opposite direction. Thus, each segment end portion 12p1 of the segment layer 12L1 and each segment end portion 12p2 of the segment layer 12L2 are twisted in opposite directions, respectively.

When the twist process of the segment end portions of the segment layer 12L1 and the segment layer 12L2 is completed, as shown by (c) and (d) in FIG. 1, in order to twist the segment end portions of the segment layer 12L3 and the segment layer 12L4 adjacent thereto in the radial outward direction, the twisting jig unit 28A connected to the rotary drive mechanism is replaced with the twisting jig unit 28B corresponding to the pair of the segment layer 12L3 and the segment layer 12L4, and the same twist process as above is performed.

Twisting jig unit 28B includes an inner twisting jig 52 having a diameter larger than that of the inner twisting jig 50 of the twisting jig unit 28A, and an outer twisting jig 53 having a diameter larger than that of the outer twisting jig 51 of the twisting jig unit 28A.

The inner twisting jig 52 and the outer twisting jig 53 respectively have the same configurations as those of the inner twisting jig 50 and the outer twisting jig 51 described above, only with different diameters. The segment end portions 12p3 of the segment layer 12L3 are inserted into the insertion grooves of the inner twisting jig 52, and the segment end portions 12p4 of the segment layer 12L4 are inserted into the insertion grooves of the outer twisting jig 53.

In this state, the inner twisting jig 52 is driven to rotate in a clockwise direction (direction of arrow R1), and the outer twisting jig 53 is driven to rotate in a counterclockwise direction (direction of arrow R2). As a result, the segment end portions 12p3 of the segment layer 12L3 and the segment end portions 12p4 of the segment layer 12L4 are twisted in opposite directions, respectively.

When the twist process of the segment end portions of the segment layer 12L3 and the segment layer 12L4 is completed, as shown by (e) and (f) in FIG. 1, in order to twist the segment end portions of the segment layer 12L5 and the segment layer 12L6, the twisting jig unit 28B connected to the rotary drive mechanism is replaced with the twisting jig unit 28C corresponding to the pair of the segment layer 12L5 and the segment layer 12L6, and the same twist process as above is performed.

Twisting jig unit 28C includes an inner twisting jig 54 having a diameter larger than that of the inner twisting jig 52 of the twisting jig unit 28B, and an outer twisting jig 55 having a diameter larger than that of the outer twisting jig 53 of the twisting jig unit 28B.

The inner twisting jig 54 and the outer twisting jig 55 respectively have the same configurations as those of the inner twisting jig 50 and the outer twisting jig 51 of the twisting jig unit 28A, only with different diameters. The segment end portions 12$p$5 of the segment layer 12L5 are inserted into the insertion grooves of the inner twisting jig 54, and the segment end portions 12$p$6 of the outermost segment layer 12L6 are inserted into the insertion grooves of the outer twisting jig 55.

In this state, the inner twisting jig 54 is driven to rotate in a clockwise direction (direction of arrow R1), and the outer twisting jig 55 is driven to rotate in a counterclockwise direction (direction of arrow R2). As a result, the segment end portions 12$p$5 of the segment layer 12L5 and the segment end portions 12$p$6 of the segment layer 12L6 are twisted in opposite directions, respectively.

As described above, in the present embodiment, only a fewer number of segment layers (two layers here) than the total number of layers, adjacent to one another in the radial direction of the core, are twisted at the same time, so that the twist process of all the segment layers can be performed under the optimum conditions that are suitable for the segment layers to be twisted in each twist process without being affected by the difference in the height of the segment end portions. Preferable conditions for each segment layer may be determined in advance by experiment or the like and set in the coil twisting apparatus. The smaller the number of layers to be twisted at the same time is, the more the influence of the height difference of the segment end portions can be reduced.

That is, height difference between segment end portions of the innermost segment layer and those of the outermost segment layer in the radial direction may be extremely large in some coils, but even in such a case fine twist process can be performed. This means, in other words, that the height of the segment end portions can be adjusted.

Although the method of FIG. 1 requires to replace twisting jig unit several times and thus more time and effort is necessary than the method of twisting all layers at the same time, the method of FIG. 1 can improve accuracy of the twist process and consequently can improve output of a motor including the manufactured coil. If the influence on the twist accuracy is small, one twisting jig unit may be configured to have three or more twisting jigs. That is, the twisting may be performed while replacing the twisting jig unit for each three or more layers. Conversely, one twisting jig unit may be configured to have only one twisting jig. Further, number of twisting jigs comprised in one twisting jig unit may vary for each twisting jig unit. That is, a configuration in which two layers are twisted and then four layers are twisted may be employed.

Further, in the method of FIG. 1, as compared with the method of twisting all layers at the same time, since the number of twisting jigs in one twisting jig unit is small, it is possible to increase thickness of each twisting jig to improve strength against the load at the time of twist process.

That is, in the method of twisting all layers at the same time, each twisting jig must be thin in consideration of weight reduction and output of the drive source, and thus insufficient strength of the twisting jigs is concerned. However, the present invention can solve this problem.

Hereinafter, the configuration and the like relating to the rotary drive of the twisting jigs in the coil twisting apparatus of the present embodiment is described in detail.

First, an overview of the configuration of the coil twisting apparatus 15 of the present embodiment will be described with reference to FIG. 6 to FIG. 9. FIG. 6 is a front view, FIG. 7 is a side view, FIG. 8 is a plan view.

The coil twisting apparatus 15 has: a rectangular shaped base 16 as a base; two props 17 arranged on the left and right of the front side on the base 16 and extending in the vertical direction; a vertical plate 18 arranged on the back side of the base 16 and extending in the vertical direction; a top plate 19 horizontally supported above the base 16 by the props 17 and the vertical plate 18; a rotary drive mechanism 20 arranged on the top plate 19; a lift mechanism 21 for lifting up and down a workpiece mounted with the segment end portions protruding upward; a twisting jig replacing unit 22 provided with a plurality of types of twisting jig units; an interlayer spacing member 23 for spreading a space between the respective layers of the coil segments (space between every two layers here) to facilitate insertion of the segment end portions into the twisting jigs before inserting the segment end portions into the twisting jigs; and the like.

Bolt screws 43 for height adjustment are provided at four corners of the base 16 and the central portion of the longitudinal direction of the base 16, so that the inclination of the upper surface of the base 16 can be adjusted.

As shown in FIG. 7, the rotary drive mechanism 20 has: a drive mechanism portion 25 of a concentric two-axis configuration whose mating convex portion 24 is fixed on the top plate 19 so as to protrude to the lower surface side of the top plate 19; an inner servomotor 26 as a first drive source configured to rotate the inner axis member having the mating convex portion 24; and an outer servomotor 27 (see FIG. 6) as a second drive source configured to rotate the outer axis member.

The twisting jig replacing unit 22 has: a plurality of twisting jig units 28A, 28B, 28C and 28D; a long-plate shaped unit holder 29 integrally supporting the twisting jig units; and a linear motion guide 30 configured to smoothly slide the unit holder 29 horizontally.

The linear motion guide 30 has: four support blocks 31 fixed in two rows on the lower surface of the top plate 19; a linear guide 32 fixed between the support blocks 31 like a bridge; and two rail members 48 fixed to the upper surface of the unit holder 29 and sliding in the linear guide 32.

On the upper surface of each twisting jig unit 28A, 28B, 28C and 28D, a mating concave portion 33 to be mated with the mating convex portion 24 is formed. When the unit holder 29 is slid and stopped at a predetermined position, the mating concave portion 33 of one of the twisting jig units 28A, 28B, 28C and 28D is mated with the mating convex portion 24. By stopping the unit holder 29 at a position corresponding to the desired twisting jig unit, the twisting jig unit is connected to the rotary drive mechanism 20, and thereby rotation of the rotary drive mechanism 20 can be transmitted to each twisting jig comprised in the twisting jig unit.

Positioning plates 34 respectively having insertion holes 34$a$ for a lock pin 35, corresponding to each twisting jig unit 28A, 28B, 28C and 28D, are fixed to the unit holder 29.

The lock pin 35 is provided on the front side of the apparatus on a bracket 44 fixed to the top plate 19. When any of the twisting jig unit 28A, 28B, 28C and 28D is set to a predetermined position, by inserting the lock pin 35 into the insertion holes 34$a$ of the positioning plate 34 corresponding to the set twisting jig, the twisting jig unit set to the predetermined position is locked at a position to perform the twist process of the segment end portions.

As shown in FIG. 6, handles 45 for sliding the unit holder 29 are attached at both ends of the longitudinal direction (lateral direction in the drawing) of the unit holder 29. The twisting jig replacing unit 22 in this embodiment employs a manual system in which the twisting jig units are replaced by pushing by hand.

FIG. 6 shows a state in which the twisting jig unit 28A is set to the predetermined position to perform the twist process. For example, to replace the twisting jig unit in this state to the twisting jig unit 28D at the left end, the unit holder 29 needs to be moved to the right side of FIG. 6 until the twisting jig unit 28D comes to the position where the twisting jig unit 28A exists in FIG. 6. Accordingly, the unit holder 29 protrudes from the main body of the coil twisting apparatus 15 to the right side in FIG. 6 in this state.

Replacement operation of the twisting jig unit is not removing the twisting jig unit which is heavy object. As described above, the replacement operation is merely sliding the unit holder 29 which supports the plurality of twisting jig units 28A, 28B, 28C and 28D via the linear motion guide 30 with little sliding resistance, and mating the mating convex portion 24 of the rotary drive mechanism 20 with the mating concave portion 33 on the twisting jig side, which is a simple operation with small effort.

The replacement operation may be automated such that the unit holder 29 is slid a predetermined amount by a drive source such as a servomotor capable of position controlling, and the lock pin is inserted by means such as a solenoid to fix the position of the unit holder 29.

The configuration relating to transmission of the rotary driving force through the concentric two-axis configuration in the rotary drive mechanism 20 will be briefly described.

In the rotary drive mechanism 20, the inner rotary axis (one of the two axes) extending in the vertical direction is driven to rotate by the inner servomotor 26 through a deceleration mechanism or the like, and the outer rotary axis (the other of the two axes) is driven to rotate by the outer servomotor 27 through a deceleration mechanism or the like.

Convex portions constituting the mating convex portion 24 are individually formed at the lower ends of the inner rotary axis and the outer rotary axis, respectively.

The twisting jig unit 28A has an inner cylinder to which rotation of the inner rotation axis is transmitted and an outer cylinder to which rotation of the outer rotation axis is transmitted, and concave portions constituting the mating concave portion 33 are individually formed at the upper ends of the inner cylinder and the outer cylinder, respectively. The inner cylinder penetrates inside the outer cylinder, an inner twisting jig 50 of the twisting jig unit 28A is attached to the lower end of the inner cylinder, and an outer twisting jig 51 of the twisting jig unit 28A is attached to the lower end of the outer cylinder.

Therefore, the inner twisting jig 50 can be rotated in one direction with the inner cylinder as an axis by the inner servomotor 26, and the outer twisting jig 51 can be rotated in the opposite direction with the outer cylinder as an axis by the outer servomotor 27. Other twisting jig units 28B, 28C and 28D also have the same configuration.

Referring to FIG. 9, a configuration relating to the connection between the rotary drive mechanism 20 and the twisting jig unit 28A by mating of concave and convex is described.

One inner mating convex portion 24a in a rectangular shape is formed integrally with the inner rotary axis at the lower end of the inner rotary axis, and a pair of outer mating convex portions 24b are formed at opposing positions in the radial direction integrally with the outer rotary axis at the lower end of the outer rotary axis. The mating convex portion 24 of the rotary drive mechanism 20 side is configured by an arrangement of the one inner mating convex portion 24a and the two outer mating convex portions 24b in a row. Reference numeral 58a indicates the lower end surface of the inner rotating axis.

A pair of inner mating concave portions 62a to be mated with the inner mating convex portion 24a are formed at the upper end of the inner cylinder 62 of the twisting jig unit 28A at positions in the radial direction corresponding to the inner mating convex portion 24a.

A pair of outer mating concave portions 63a to be mated with the outer mating convex portions 24b are formed on the upper face of the outer cylinder 63 of the twisting jig unit 28A at positions in the radial direction corresponding to the outer mating convex portions 24b.

The mating concave portion 33 of the twisting jig unit 28A side is configured by an arrangement of the two inner mating concave portions 62a and the two outer mating concave portions 63b in a row. Other twisting jig units 28B, 28C and 28D also have the same configuration.

In the present embodiment, the mating convex portion is formed on the rotary drive mechanism side and the mating concave portion is formed on the twisting jig unit side, but conversely, the mating concave portion may be formed on the rotary drive mechanism side and the mating convex portion may be formed on the twisting jig unit side.

As shown in FIG. 10 and FIG. 11A to FIG. 11C, the interlayer spacing member 23 has a plurality of rod-shaped handling members 74 arranged radially in a horizontal plane. The interlayer spacing member 23 is a member configured to expand a space between the layers of the coil segments by every two layers before the twist process by moving the handling members 74 simultaneously in the radial direction and the vertical direction (axial direction) of the core.

In a state immediately after inserting the respective coil segments into the slots 72b at the time when firstly placed on the lifting table 36 of the coil twisting apparatus 15 (see FIG. 6), segment end portions of respective layers are close to one another in the radial direction, and if the segment end portions are attempted to be inserted into the insertion portions of the twisting jigs in this state, the insertion may be hindered by the adjacent segment end portions, resulting in failure. The interlayer spacing member 23 is provided to address this point.

As shown in FIG. 10, each handling member 74 includes: a connecting axis 74a to the drive source configured to move the handling member 74 simultaneously in the radial direction; a concave portion 74b formed at the inner tip portion in the radial direction; and an insertion hole 74c.

Each handling member 74 is connected with a cam member (not shown) through the connecting axis 74a, and when the cam member is rotated by the drive source, a plurality of handling members 74 move simultaneously in the radial direction (X direction). Further, each handling member 74 is movable in the vertical direction (Z direction; the longitudinal direction of the segment end portion) integrally by a mechanism described later.

Referring to FIG. 11A to FIG. 11C, handling operation by the interlayer spacing member 23 will be described. In this handling operation, firstly, as shown in FIG. 11A, the vertical level and the radial position of each handling member 74 are adjusted so that the segment end portions 12p3 of the segment layer 12L3, the segment end portions 12*p*4 of the segment layer 12L4, the segment end portions 12*p*5 of the segment layer 12L5 and the segment end portions 12*p*6 of the segment layer 12L6 are inserted in each insertion hole 74*c* thereof.

Next, as shown in FIG. 11B, each handling member 74 is moved outward in the radial direction, and then lowered so that a space between the segment layers 12L1, 12L2 and the segment layers 12L3, 12L4 is expanded. At this time, each handling member 74 interferes with the segment end portions 12*p*3 of the segment layer 12L3 as it descends, causing the segment end portions 12*p*3 to move outward in the radial direction. Further, the segment end portions 12*p*3 move the segment end portions 12*p*4 to 12*p*6 of the outer segment layers outward in the radial direction.

Even if the bottom surface of each handling member 74 (lower surface in the figure) is lowered to a position lower than the tip of the segment end portions of the segment layer 12L1 and the segment layer 12L2, the segment end portions of these segment layers do not interfere with the handling member 74 because they are accommodated in the concave portion 74*b*. The expanding width W is determined such that the insertion into the insertion portions (hole or groove, etc.) of the twisting jigs can be reliably performed in consideration of the recovery after the expanding (spring back).

As shown in FIG. 11C, the fifth layer and the sixth layer can be expanded by the same operation as described above.

The operation of the interlayer gap formation by the interlayer spacing member 23 is performed after the segment end portions are opposed to the twisting jigs by raising the workpiece by the lift mechanism 21 described below.

By performing the handing operation (interlayer gap formation) by the interlayer spacing member 23, the layers are spaced in the radial direction of the core for each two layers to be twisted with one twisting jig unit, and thus insertion of the segment end portions to each twisting jig unit can be performed with high accurately.

Thus, as compared with the case where the segment end portions of each layer are close to one another in the radial direction, complexity and trouble of alignment of the segment end portions with respect to the twisting jigs can be reduced. It is possible to improve work efficiency in the twist process, and eventually it is possible to contribute to improvement of manufacturing efficiency of rotary electric machines.

As shown in FIG. 6 and FIG. 7, the lift mechanism 21 has: the lifting table 36 configured to place a workpiece thereon, a servomotor 37 as a drive source configured to raise and lower the lifting table 36; a driving force converting portion 49 configured to convert the rotation of the servomotor 37 into movement in the vertical direction of the support axis 36*a* of the lifting table 36; and a linear motion guide 38 provided in the vertical plate 18 to guide the raising and lowering of the lifting table 36.

The linear motion guide 38 has two rails 39 fixed in parallel to each other on the front side of the vertical plate 18 and extending in the vertical direction, and sliders 40 configured to slide on the rails 39. The lifting table 36 is supported by the sliders 40.

A member indicated by the reference numeral 41 in FIG. 7 is a pallet conveying guide configured to place a pallet loaded with the work on the lifting table 36 of the lifting mechanism 21. As shown in FIG. 8, the member has a plurality of rollers 42 on both sides, so that the pallet loaded with the work can move smoothly to the lifting table 36 side (arrow T direction).

A plurality of rollers whose levels are substantially the same as the rollers 42 of the pallet conveying guide 41 are provided on both sides of the lifting table 36, and the pallet can be smoothly moved from the pallet conveying guide 41 to the lifting table 36.

When performing processing according to an embodiment of the coil segment processing method of the invention on coil segments by the coil twisting apparatus 15, a workpiece 72 assembled by a coil assembling apparatus not shown, in which the coil segments are inserted into slots, is placed on a carriage in a state that the workpiece 72 is placed on a pallet at the outside of the coil twisting apparatus 15, and is passed to the pallet conveying guide 41 along with the pallet.

When the workpiece 72 is set to a predetermined position, the servomotor 37 rotates to raise the lifting table 36. When the lifting table 36 reaches a predetermined position, the interlayer gap forming operation by the interlayer spacing member 23 is started.

When the interlayer gap forming operation is completed, the lifting table 36 is raised a predetermined distance so that, as shown by (a) in FIG. 1, the segment end portions of the innermost segment layer 12L1 and the segment layer 12L2 adjacent thereto are inserted into the insertion grooves of the inner twisting jig 50 and the outer twisting jig 51 of the twisting jig unit 28A, and the twist process described above is performed.

Next, the twist process is performed on a pair of adjacent segment layers 12L3 and 12L4, and a pair of adjacent segment layers 12L5 and 12L6, respectively. When the twist process is completed, the lifting table 36 is lowered, and the processed workpiece is taken out.

Next, FIG. 12 shows a configuration of a control unit configured to control the above coil twisting apparatus 15. The coil twisting apparatus 15 may be configured such that an operator directly operates on-off and driving direction of each servomotor and the like by switches and the like, or that the processing procedure is programmed in advance and the above-mentioned process can be performed by an automatic control. Shown in FIG. 12 is a control unit for this automatic control.

A control unit shown in FIG. 12 at least has a function of controlling operations of various drive sources provided in the coil twisting apparatus 15, that is, the inner servomotor 26, the outer servomotor 27, the servomotor 37, a handling member drive source 98 configured to drive the handling members 74, and the like, and has a CPU 91, a non-volatile memory 92, a RAM 93, an operation unit I/F 94, an operation unit 95, a drive unit I/F 96, a communication I/F 97, and a system bus 99.

The CPU 91 is a processor configured to control operations of various drive sources in accordance with the parameters stored in the non-volatile memory 92 and the operations by an operator performed on the operation unit 95 by executing programs stored in the non-volatile memory 92 using the RAM 93 as a work area.

The operation unit 95 is a unit configured to accept operations by an operator, such as a key, a button, a touch panel, or the like. The operation unit I/F 94 is configured to supply signals indicating operations performed on the operation unit 95 to the CPU 91.

The driving unit I/F 96 is an interface configured to supply control signals to various drive sources in accordance with instructions from the CPU 91.

The communication I/F 97 is an interface configured to communicate with external apparatuses.

The programs executed by the above-described CPU 91 include a program that defines the procedures of the above-described handling operation and twisting process. Parameters stored in the non-volatile memory 92 are: a raising amount of the workpiece 72 (lifting table 36) for inserting the segment end portions into the twisting jigs for each twisting jig unit; a raising amount of the workpiece 72 and a rotating speed and a rotating amount of each twisting jig (twist characteristics) during the twisting process; a moving amount of the handling member 74 for the handling operation; and the like.

The CPU91 instructs operations of the various drive sources to the drive unit I/F 96 in accordance with the above programs and parameters, thereby the coil twisting apparatus 15 automatically performs the above described processes such that the twist process including rotation of the inner twisting jig 50 and the outer twisting jig 51 while raising the workpiece 72, and the handling operation by the interlayer spacing member 23 (each of the handling members 74). The same automatic control is applicable to the second embodiment described below.

Next, the second embodiment will be described with reference to FIG. 13 to FIG. 21. It should be noted that the same components as those in the above embodiment are denoted by the same reference numerals, and description of the above-described configurations and functions is omitted as appropriate.

As shown in FIG. 13, a connection structure 77A of coil segments in an electrical rotating machine according to the present embodiment is a structure wherein the segment end portions protruding from the end face of the core 72a includes: segment end portions 12p1 to 12p6 (first segment end portions) for connection, twisted in the circumferential direction of the core 72a; and segment end portions 12p1s and 12p6s (second segment end portions) for power supply lines, extending in the axial direction of the core 72a (not twisted), and wherein the segment end portions 12p1s and 12p6s for power supply lines, opposing to each other in the radial direction of the core 72a, are connected with each other via a terminal 78 as a conductor. It is not necessary that the segment end portions 12p1s and 12p6s for power supply lines are at the exact same position in the circumferential direction, and they may be only close to each other with some gap in the circumferential direction.

The segment end portions 12p1s and 12p6s for power supply lines as specific segment end portions are provided only in a predetermined layer or predetermined layers (here, the innermost segment layer 12L1 and the outermost segment layer 12L6).

In either layer, the segment end portions 12p1s and 12p6s for power supply lines are protruding longer from the end face of the core than the segment end portions 12p1 and 12p6 for connection provided in the same layer. Further, the segment end portions 12p1s and 12p6s are provided to replace some of the segment end portions 12p1 and 12p6 for connection.

The twisting in the present embodiment is basically the same as that in the first embodiment described above, but the twist process using a pushing member is performed on the innermost segment layer 12L1 and the outermost segment layer 12L6.

That is, the twisting is performed such that the two segment end portions 12p1s for power supply lines in the innermost segment layer 12L1 remains not being twisted by the rotation of the twisting jig, and the two segment end portions 12p6s for power supply lines in the outermost segment layer 12L6 remain not being twisted by the rotation of the twisting jig.

A coil twisting method of allowing particular segment end portions to remain not being twisted is described below.

FIG. 14 shows a twisting jig unit 28C used in this method, corresponding to the outermost segment layer 12L6 and the segment layer 12L5 on the inner side thereof, and the pushing member 80. The inner twisting jig 54 of the twisting jig unit 28C is provided with a plurality of insertion grooves (accommodating portions) 54a to accommodate the segment end portions 12p5 for connection, of the segment layer 12L5, and the outer sides of the insertion grooves 54a in the radial direction are closed by the inner surface of the outer twisting jig 55.

The outer twisting jig 55 is provided with a plurality of insertion grooves (accommodating portions) 55a to accommodate the segment end portions 12p6 for connection, of the segment layer 12L6, and the outer sides of the insertion grooves 55a in the radial direction are closed by an outer ring 55b

The pushing member 80 includes: an insertion frame 81 having an insertion groove 81a to accommodate the segment end portions 12p6s for power supply lines as particular segment end portions existing in the outermost segment layer 12L6; and a curved frame configured to close the inner side of the insertion groove 81a of the insertion frame 81 in the radial direction and push the segment end portions 12p6s for power supply lines to positions where the segment end portions 12p6s do not interfere with the outer twisting jig 55.

In this embodiment, when placing the workpiece 72 on the lifting table 36 of the coil twisting apparatus 15 for the twisting, the segment end portions 12p1s and 12p6s for power supply lines are aligned to come to specific positions in the circumferential direction of the workpiece 72. The pushing member 80 may be provided on the outer periphery of the outer ring 55b in a range where the segment end portions 12p1s and 12p6s for power supply lines come after the alignment. It is also possible to provide the pushing member 80 in a wider range in the circumferential direction to obtain a margin to some extent. In FIG. 14 and FIG. 15, the left side in the drawing corresponds to this range, and the right side in the drawing does not correspond to this range.

Then, when raising the workpiece 72 while shifting slightly outward the segment end portions 12p6s for power supply lines as shown in FIG. 14, the tip of the segment end portions 12p6s for power supply lines are guided by the curved frame 82 to enter the insertion groove 81a as shown in FIG. 15. As the workpiece 72 is raised further, the segment end portions 12p6s for power supply lines are pushed and bent along the shape of the curved frame 82, pushed away to positions where the segment end portions 12p6s do not interfere with the outer twisting jig 55, and held not to hinder the twist operation by the outer twisting jig 55 on the remaining segment end portions 12p6 for connection. The tip and the side surface of the curved frame 82 which contact with the segment end portions 12p6s are preferably formed to be smoothly curved surfaces so that the segment end portions 12p6s for power supply lines can be pushed and bent without being scratched.

In the state of FIG. 15, the segment end portions 12p5 and 12p6 for connection are inserted into the insertion grooves 54a and 55a, respectively, and the twist process as in the case of the first embodiment can be performed by rotating the inner twisting jig 54 and the outer twisting jig 55.

The pushing member 80 is fixed to the unit holder 29 separately from the twisting jig unit 28C and holds the segment end portions 12p6s for power supply lines without rotating even during the rotation of the inner twisting jig 54 and the outer twisting jig 55. The pushing member 80 may be fixed to any other fixing frame, not limited to the unit holder 29.

Due to the above operation, as shown in FIG. 16, only the segment end portions 12*p*6 for connection are twisted in the segment layer 12L6, and the segment end portions 12*p*6*s* for power supply lines remain without being twisted because they are not inserted into the insertion grooves 55*a* of the outer twisting jig 55. That is, the segment end portions 12*p*6*s* remain extended in the axial direction of the core 72*a*.

Note that a process of displacing the segment end portions 12*p*6*s* for power supply lines outward can be performed using the interlayer spacing member 23 shown in FIG. 10 as a displacing member. Since the segment end portions 12*p*6*s* for power supply lines protrude longer from the end face of the core than the segment end portions 12*p*6 for connection, of the same layer, it is possible to displace the segment end portions 12*p*6*s* for power supply lines outward without affecting the segment end portions 12*p*6 for connection, by adjusting level in the vertical direction and position in the radial direction of each handling member 74 so that only the segment end portions 12*p*6*s* for power supply lines are respectively inserted into the insertion holes 74*c*, and then moving each handling member 74 outward in the radial direction, similar to the case of the handling operation of FIG. 11A to FIG. 11C.

Further, even when the segment end portions 12*p*6*s* for power supply lines and the segment end portions 12*p*6 for connection, of the same layer, protrudes from the end face of the core by the same length before the twisting, it is possible to displace only the segment end portions 12*p*6*s* for power supply lines outward without affecting the segment end portions 12*p*6 for connection as in the case above, if the segment end portions 12*p*6*s* protrudes longer than the segment end portions for connection, of other layers, and an interlayer spacing member dedicated to the displacement process comprising handling members 74 only at positions in the circumferential direction where the segment end portions 12*p*6*s* for power supply lines are to be positioned is adopted.

For the innermost segment layer 12L1, it is possible to twist only the segment end portions 12*p*1 for connection, and keep the segment end portions 12*p*1*s* for power supply lines without being twisted, i.e., extending in the axial direction of the core 72*a*, as in the case above.

With respect to the segment layer 12L1, a pushing member similar to the pushing member 80 may be provided on the inner peripheral side of the inner twisting jig 50 in the twisting jig unit 28A corresponding to the segment layers 12L1 and 12L2. Then, the segment end portions 12*p*1*s* for power supply lines can be displaced outward by pushing them using the interlayer spacing member 23 as a displacing member, and then pushed away to positions where the segment end portions 12*p*1*s* for power supply lines do not interfere with the inner twisting jig 50.

Thus, as shown in FIG. 17, only the segment end portions 12*p*1 for connection, of the innermost segment layer 12L1, are twisted, and the segment end portions 12*p*1*s* for power supply lines remain without being twisted.

By keeping the segment end portions 12*p*1*s* and 12*p*6*s* for power supply lines without being twisted, the segment end portions 12*p*1*s* and 12*p*6*s* can be opposed to each other in the radial direction of the core 72*a* as shown in FIG. 13, and thus a connection configuration of the power supply lines with the electrical connection via the terminal 78 along the shortest distance can be obtained. It is not necessary that the segment end portions 12*p*1*s* and 12*p*6*s* for power supply lines are at the exact same position in the circumferential direction, and they may be only close to each other.

If the segment end portions for power supply lines were twisted in the same way as the segment end portions for connection, the segment end portions for power supply lines of the odd-numbered layer and those of the even-numbered layer are twisted in opposite directions and come to distant positions in the circumferential direction, and accordingly wiring configuration with a long conductor is necessary. However, according to the method and configuration of the present embodiment, the connection can be easily realized via the terminal 78 having a small area, and thus the connection configuration of the power supply lines can be extremely simplified. This simple configuration can also contribute to improvement of reliability.

However, if the segment end portions 12*p*1*s* and 12*p*6*s* for power supply lines are expanded in the radial direction by the pushing member 80 not to interfere with the twisting jigs as shown in FIG. 15, the segment end portions for power supply lines protrude inward in the radial direction in the innermost segment layer 12L1 and protrude outward in the radial direction in the outermost segment layer 12L6. The inward protrusion in the innermost segment layer 12L1 narrows the inner diameter of the core 72*a*, which may hinder the insertion operation of the rotor.

An example of addressing this point will be described with reference to FIG. 18 to FIG. 20. As shown in FIG. 18, a connection structure 77B of coil segments according to the present embodiment is a structure wherein the segment end portions protruding from the end face of the core 72*a* includes: segment end portions 12*p*1 to 12*p*6 (short segment end portions) for connection twisted in the circumferential direction of the core 72*a*; two segment end portions (first long segment end portions) 12*p*1*s*' for power supply lines in the innermost segment layer 12L1 (first layer), protruding longer than the segment end portions 12*p*1 for connection and twisted in the same direction as the segment end portions 12*p*1 for connection; and two segment end portions (second long segment end portions) 12*p*6*s*' for power supply lines in the outermost segment layer 12L6 (second layer), protruding longer than the segment end portions 12*p*6 for connection and twisted in a direction opposite to the twisting direction of the segment end portions 12*p*6 (short segment end portions) for connection.

The segment end portions 12*p*1*s*' for power supply lines and the segment end portions 12*p*6*s*' for power supply lines opposing thereto are electrically connected via the terminal 78. The segment end portions 12*p*1 to 12*p*6 for connection of each layer are twisted in opposite directions alternately layer by layer.

In the twisting in the present embodiment, regarding the innermost segment layer 12L1, the segment end portions 12*p*1 for connection and the segment end portions 12*p*1*s*' for power supply lines are simultaneously twisted in the same direction as shown in FIG. 19, using an inner twisting jig (first twisting jig) having accommodating portions (here, insertion grooves) configured to accept insertion of the segment end portions 12*p*1 for connection and accommodating portions configured to accept insertion of the long segment end portions 12*p*1*s*' for power supply lines. At this time, the segment end portions 12*p*1*s*' for power supply lines are not pushed to a position where they do not interfere with the inner twisting jig. Therefore, the segment end portions 12*p*1*s*' for power supply lines do not protrude to the inner side in the radial direction.

Incidentally, the depth of each accommodating portion may be all the same as long as the long segment end portions 12*p*1*s*' for power supply lines can be accommodated therein. Alternatively, if the workpiece 72 is arranged such that the segment end portions 12p1s' for power supply lines come to specific positions in the circumferential direction, the depth of the accommodating portions configured to accommodate the segment end portions 12p1s' for power supply lines may be deeper than the depth of the accommodating portions configured to accommodate the segment end portions 12p1 for connection. In any case, the part of each segment end portion which is inserted into the accommodating portion remains straight after the twist process.

Further, the inner twisting jig described here can be used in place of the inner twisting jig 50 of the twisting jig unit 28A.

On the other hand, regarding the outermost segment layer 12L6, the segment end portions 12p6s' for power supply lines are pushed away to positions where they do not interfere with the outer twisting jig 51 (second twisting jig) and then only the segment end portions 12p6 for connection are twisted first, using the pushing member 80 and the twisting jig unit 28C as described in FIG. 14 and FIG. 15. Thereafter, as shown in FIG. 20, only the segment end portions 12p6s' for power supply lines which remain without being twisted, are twisted in a direction opposite to the twisting direction of the segment end portions 12p6 for connection (in the same direction as the segment end portions 12p1s' for power supply lines) so that the segment end portions 12p6' oppose to the segment end portions 12p1s' for power supply lines, using another twisting jig (third twisting jig).

In this way, it is possible to form a simple connection configuration of power supply lines without narrowing the inner diameter of the core 72a.

Although the present embodiment adopts the configuration of pushing the segment end portions for power supply lines remaining without being twisted away to positions where they do not interfere with the twisting jig by the pushing member 80, as shown in FIG. 21, the segment end portions 12p6s or 12p6s' for power supply lines may be pushed to positions where they do not interfere with the twisting jig by using the interlayer spacing member 23 described in the first embodiment. That is, the interlayer spacing member 23 may be used as a displacing member. When pushing the segment end portions 12p1s or 12p1s' for power supply lines in the innermost segment layer 12L1, the segment end portions may be pressed to the center side of the core by the interlayer spacing member 23. On the contrary, a member other than the interlayer spacing member 23 may be used as the above-mentioned displacing member.

Further, the shapes of the twisting jigs may be changed so that the twisting jigs themselves have the function of the pushing member 80.

Further, in the above-described embodiment, it has been described that the segment end portions 12p1s and 12p6s for power supply lines are aligned when the pushing member 80 is used. However, this is not essential. If the segment end portions 12p1s and 12p6s for power supply lines projects longer from the end face of the core than the segment end portions 12p1 and 12p6 for connection, of the same layer, it is possible to displace the segment end portions 12p1s and 12p6s for power supply lines by some of the handling members 74, regardless of the circumferential position of the segment end portions 12p1s and 12p6s. Then, if the pushing member 80 is provided on the entire periphery of the outer ring 55b, the segment end portions 12p1s and 12p6s for power supply lines can be pushed to a position where they do not interfere with the twisting jig regardless of the circumferential positions thereof.

Further, in the above embodiment, an example of a stator as the work has been described, but rotors can also be implemented in the same manner.

Preferred embodiments of the present invention are described above. However, the present invention is not limited to such specific embodiments, and various modifications and variations are conceivable. The above-described configuration of the present invention can be implemented by extracting only a part thereof, and the variations described in the above explanation can be applied in any combination as long as they do not conflict with each other. The effects described in the embodiments of the present invention are merely illustrative of the most preferred effects resulting from the present invention, and the effects according to the present invention are not limited to those described in the embodiments of the present invention.

REFERENCE SIGNS LIST

12p1 to 12p6 . . . segment end portions for connection, 12p1s and 12p6s . . . segment end portions for power supply lines, 15 . . . coil twisting apparatus, 20 . . . rotary drive mechanism, 23 . . . interlayer spacing member, 24 . . . mating convex portion, 28A to 28D . . . twisting jig units, 29 . . . unit holder, 33 . . . mating concave portion, 50 to 55 . . . twisting jigs, 72 . . . stator or rotor (workpiece), 72a . . . core, 77A and 77B . . . connection structures of coil segments, 80 . . . pushing member

The invention claimed is:

1. A coil segment processing method for processing a plurality of coil segments inserted into slots of a core of a stator or a rotor, comprising:
    performing twisting to the plurality of coil segments inserted into the slots such that segment end portions that are end portions of the respective coil segments protruding from an end face of the core form a plurality of layers in a radial direction of the core,
    using a plurality of twisting jig units respectively comprising a smaller number of twisting jigs than total number of the plurality of the layers, the twisting jigs being concentrically disposed, each of the twisting jigs corresponding to any one of the plurality of layers respectively and comprising accommodating portions configured to respectively accommodate the segment end portions of the corresponding layer,
    wherein the twisting comprises a twist process of accommodating, into the accommodating portions of each twisting jig of one of the plurality of twisting jig units, the segment end portions of each layer corresponding to the each twisting jig, respectively, and rotating the each twisting jig so as to twist the accommodated segment end portions,
    wherein the twisting comprises sequentially performing the twist process using each of the plurality of twisting jig units so as to twist segment end portions of all of the layers, and
    wherein the twisting process using a first twisting jig corresponding to a predetermined layer among the twisting jigs is performed in a state that a position in the radial direction of a particular segment end portion among a plurality of segment end portions of the predetermined layer is shifted to a position different from that of other segment end portions of the predetermined layer so that the particular segment end portion is not accommodated into any of the accommodating portions of the first twisting jig.

2. The coil segment processing method according to claim 1, comprising selectively pushing the particular segment end portion by a pushing member to a position where the particular segment end portion does not interfere at least with the first twisting jig during the twist process using the first twisting jig, prior to the twist process using the first twisting jig.

3. The coil segment processing method according to claim 2, wherein the pushing by the pushing member is performed after displacing the particular segment end portion in the radial direction by a displacing member different from the pushing member.

4. The coil segment processing method according to claim 3, further comprising expanding a space in the radial direction between the segment end portions of each layer to be twisted by a twisting jig unit including the first twisting jig and the segment end portions of other layers, prior to the accommodating of the segment end portions into the accommodating portions of the first twisting jig,
   wherein a member that interferes with the segment end portions and moves the segment end portions in the expanding is used as the displacing member.

5. The coil segment processing method according claim 1, wherein the predetermined layer is an outermost layer and/or an innermost layer in the radial direction among the plurality of layers.

6. The coil segment processing method according to claim 1, further comprising, regarding each of the plurality of the twisting jig units, expanding a space in the radial direction between the segment end portions of each layer twisted by the twisting jig unit and the segment end portions of other layers, prior to the accommodating of the segment end portions into the accommodating portions of twisting jigs of the twisting jig unit.

7. The coil segment processing method according claim 1,
   wherein each of the plurality of twisting jig units is held by a unit holder which is movably supported, and
   wherein when performing the twist process using each of the plurality of twisting jig units, a twisting jig unit to be used for the twist process is changed by moving the unit holder and connecting one twisting jig unit selected among the plurality of twisting jig units with a rotary drive mechanism to rotate each twisting jig of the selected one twisting jig unit.

8. A coil segment processing method for processing a plurality of coil segments inserted into slots of a core of a stator or a rotor, comprising:
   performing twisting to the plurality of coil segments inserted into the slots such that segment end portions that are end portions of the respective coil segments protruding from an end face of the core form a plurality of layers in a radial direction of the core,
   using a plurality of twisting jig units respectively comprising a smaller number of twisting jigs than total number of the plurality of the layers, the twisting jigs being concentrically disposed, each of the twisting jigs corresponding to any one of the plurality of layers respectively and comprising accommodating portions configured to respectively accommodate the segment end portions of the corresponding layer,
   wherein the twisting comprises a twist process of accommodating, into the accommodating portions of each twisting jig of one of the plurality of twisting jig units, the segment end portions of each layer corresponding to the each twisting jig, respectively, and rotating the each twisting jig so as to twist the accommodated segment end portions,
   wherein the twisting comprises sequentially performing the twist process using each of the plurality of twisting jig units so as to twist segment end portions of all of the layers,
   wherein a first long segment end portion exists in an innermost layer in the radial direction, the first long segment end portion protruding from the end face of the core longer than other segment end portions of the innermost layer, and a second long segment end portion exists in an outermost layer in the radial direction, the second long segment end portion protruding from the end face of the core longer than other segment end portions of the outermost layer,
   wherein the twist process regarding the innermost layer is performed using a first twisting jig corresponding to the innermost layer such that the first long segment end portions and said other segment end portions of the innermost layer are twisted in a same twisting direction, and
   wherein the twist process regarding the outermost layer is performed such that, after shifting a position in the radial direction of the second long segment end portion to a position different from that of other segment end portions of the outermost layer, said other segment end portions of the outermost layer are twisted in a twisting direction opposite to the twisting direction of the segment end portions of the innermost layer using a second twisting jig corresponding to the outermost layer, and then the second long segment end portion is twisted in a direction same as the twisting direction of the segment end portions of the innermost layer using a third twisting jig other than the second twisting jig so that the second long segment end portion almost opposes to the first long segment end portion.

9. A coil segment processing apparatus configured to process a plurality of coil segments inserted into slots of a core of a stator or a rotor, the plurality of coil segments being inserted into the slots such that segment end portions that are end portions of the respective coil segments protruding from an end face of the core form a plurality of layers in a radial direction of the core, comprising:
   a plurality of twisting jig units respectively comprising a smaller number of twisting jigs than total number of the plurality of the layers, the twisting jigs being concentrically disposed, each of the twisting jigs corresponding to any one of the plurality of layers respectively and comprising accommodating portions configured to respectively accommodate the segment end portions of the corresponding layer;
   a driving mechanism configured to move one twisting jig unit and/or the core with the coil segments inserted thereinto so as to accommodate, into the accommodating portions of each twisting jig of the one twisting jig unit selected from the plurality of the twisting jig units, the segment end portions of layers corresponding to the each twisting jig, respectively;
   a rotary drive mechanism connectable to a twisting jig unit arbitrarily selected from the plurality of the twisting jig units and configured to rotate each twisting jig of a twisting jig unit connected thereto in a rotating direction opposite to that of radially adjacent twisting jig; and
   a pushing member configured to selectively push a particular segment end portion among a plurality of segment end portions of a predetermined layer among the plurality of the layers to a position where the particular segment end portion does not interfere at least with a first twisting jig corresponding to the predetermined layer so that the particular segment end portion is not accommodated into any of accommodating portions of the first twisting jig even when the segment end portions of the predetermined layer are accommodated into the accommodating portions of the first twisting jig by the driving mechanism.

10. The coil segment processing apparatus according to claim 9, comprising a controller configured to control the rotary drive mechanism and the driving mechanism to perform a twist process of accommodating, into the accommodating portions of each twisting jig of one of the plurality of the twisting jig units, the segment end portions of each layer corresponding to the each twisting jig, respectively, and rotating the respective twisting jigs so as to twist the accommodated segment end portions.

11. The coil segment processing apparatus according to claim 9, wherein the predetermined layer is an outermost layer and/or an innermost layer in the radial direction among the plurality of layers.

12. The coil segment processing apparatus according claim 9, comprising a unit holder that is movably supported and configured to hold each of the plurality of twisting jig units, wherein one twisting jig unit selected among the plurality of twisting jig units is connected with the rotary drive mechanism due to movement of the unit holder.

13. The coil segment processing apparatus according to claim 12,
wherein a concave portion is formed on either one of the rotary drive mechanism and the plurality of the twisting jig units, and a convex portion to be fitted to the concave portions is formed on the rotary drive mechanism or the plurality of the twisting jig units to be connected to the either one, and
wherein rotary driving force is transmitted from the rotary drive mechanism to the twisting jig unit connected to the rotary drive mechanism through connection between the concave portion and the convex portion due to the movement of the unit holder.

14. The coil segment processing apparatus according to claim 9, wherein, in at least one twisting jig unit among the plurality of the twisting jig units, an axis of one twisting jig comprised in the at least one twisting jig unit passes through an axis of another twisting jig comprised in the at least one twisting jig unit.

15. The coil segment processing apparatus according to claim 9, comprising an interlayer spacing mechanism configured to expand a space in the radial direction between the layers with each number of layers to be twisted using one twisting jig unit.

16. The coil segment processing apparatus according to claim 15, wherein the interlayer spacing mechanism comprises a plurality of handling members disposed radially to correspond to the respective slots and integrally movable in the radial direction, and configured to interfere with segment end portions inserted to the corresponding slots so as to move the segment end portions respectively.

17. A connection structure of coil segments comprising:
a core of a stator and/or a rotor; and
a plurality of coil segments inserted into slots of the core, the plurality of coil segments being inserted into the slots such that segment end portions that are end portions of the respective coil segments protruding from an end face of the core form a plurality of layers in a radial direction of the core,
wherein the segment end portions include short segment end portions and long segment end portions protruding longer from the end face of the core than the short segment end portion of same layer,
a first long segment end portion existing in a first layer among the plurality of layers is twisted, in a circumferential direction of the core, in same twisting direction as a twisting direction of the short segment end portions of the first layer,
a second long segment end portion existing in a second layer different from the first layer among the plurality of layers is twisted, in a circumferential direction of the core, in same twisting direction as the twisting direction of the first long segment end portion that is opposite to a twisting direction of the short segment end portions of the second layer, and
the first long segment end portion and the second long segment end portion substantially oppose to each other in the radial direction and are connected with each other via a conductor.

* * * * *